US007194404B1

(12) United States Patent
Babst et al.

(10) Patent No.: US 7,194,404 B1
(45) Date of Patent: Mar. 20, 2007

(54) LINGUISTIC RETRIEVAL SYSTEM AND METHOD

(75) Inventors: Jürgen Babst, Kassel (DE); Bruce R. Baker, Pittsburgh, PA (US); Doug N. Miller, Berlin, OH (US); Jeffrey C. Micher, Pittsburgh, PA (US); Paul Andres, Springe (DE); Marianne Cameron, Dalton, OH (US)

(73) Assignee: Semantic Compaction Systems, Pittsburgh, PA (US)

( * ) Notice: Subject to any disclaimer, the term of this patent is extended or adjusted under 35 U.S.C. 154(b) by 948 days.

(21) Appl. No.: 09/652,035

(22) Filed: Aug. 31, 2000

(51) Int. Cl.
*G06F 17/27* (2006.01)
(52) U.S. Cl. .................. 704/9; 704/1; 704/10
(58) Field of Classification Search ........... 715/534, 715/535; 704/1, 9, 10
See application file for complete search history.

(56) References Cited

U.S. PATENT DOCUMENTS

| | | | |
|---|---|---|---|
| 4,438,505 A * | 3/1984 | Yanagiuchi et al. ........... 704/7 |
| 4,674,066 A | 6/1987 | Kucera |
| 4,760,528 A | 7/1988 | Levin |
| 4,969,097 A * | 11/1990 | Levin ........................ 715/534 |
| 5,040,113 A | 8/1991 | Mickunas |
| 5,169,342 A * | 12/1992 | Steele et al. ................ 434/112 |
| 5,369,577 A * | 11/1994 | Kadashevich et al. ......... 704/9 |
| 5,621,641 A * | 4/1997 | Freeman ..................... 715/534 |
| 5,649,223 A * | 7/1997 | Freeman ..................... 715/534 |
| 5,896,321 A | 4/1999 | Miller et al. |
| 5,959,629 A * | 9/1999 | Masui ........................ 345/808 |
| 6,008,799 A | 12/1999 | Van Kleeck |
| 6,022,222 A * | 2/2000 | Guinan ....................... 434/169 |
| 6,377,965 B1 * | 4/2002 | Hachamovitch et al. .... 715/534 |

FOREIGN PATENT DOCUMENTS

| | | |
|---|---|---|
| EP | 1 031 914 A2 | 8/2000 |
| WO | 00/41062 | 7/2000 |

OTHER PUBLICATIONS

Gregor et al., The applications of computing technology to interpersonal communication at the University of Dundee's Department of Applied Computing, Invited Paper, Technology and Disability (1999), pp. 1-23.*

(Continued)

*Primary Examiner*—Richemond Dorvil
*Assistant Examiner*—Lamont Spooner
(74) *Attorney, Agent, or Firm*—Harness, Dickey, & Pierce, P.L.C.

(57) ABSTRACT

A system, method and article of manufacture utilize word chunks to enhance word prediction. At least one of selectable words and word chunks are displayed in response to receipt of an input character. Thereafter, a selection of a displayed word or word chunk is received, and in response to receiving selection of a displayed word chunk, selectable words including the selected word chunk are displayed. A word chunk includes a word portion used in the formation of other words and includes a predetermined identifier, identifying it as a word chuck. Thus, the combination of chunking of parts of agglutinated words in combination with letter input activations reduces the overall number of input activations to complete a word, and further reduces the amount of choices to select from at any point during retrieval of the word. Accordingly, for such agglutinating languages such as German, for example, word chunks can be used to speed up word prediction and thereby eliminate unnecessary, time consuming, and sometimes difficult inputting of many individual characters.

50 Claims, 20 Drawing Sheets

OTHER PUBLICATIONS

Albacete et al. Iconic Language Design for People with Significant Speech and Mutiple Impairments, 1994 ACM, p. 23-30.*

German Office Action.

Nestor Garay-Vitoria et al., "Intelligent Word-Prediction to Enhance Text Input Rate (A Syntactic Analysis-Based Word-Prediction Aid for People with Severe Motor and Speech Disability)", IUI '97, 1997 International Conference on Intelligent User Interfaces, Orlando, Jan. 6-9, 1997, IUI International Conference on Intelligent User Interfaces, New York, ACM, US, Jan. 6, 1997, pp. 241-244.

* cited by examiner zeit~

| Zeit | Zeitschrift | zeitung~ |
|---|---|---|
| Zeitalter | Zeitansage | Zeitaufwand |
|  |  | Zeitwand |

Zeitungsausschnitt | Zeitungsausschnitts | Zeitungsausschnitte | Zeitungsausschnitten ~3

```
zeit~,1,0,2,0,20
zeit~alter,1,0,0,4,5
zeit~ansage,1,0,1,0,5
zeit~aufwand,1,0,15,4,5
zeit~bombe,1,0,1,0,5
zeit~druck,1,0,7,4,5
zeit~geist,1,0,8,4,5
zeit~gemäß,6,5
zeit~genosse,1,0,1,1,5
zeit~ig,6,5
zeit~karte,1,0,1,0,5
zeit~kritisch,6,5
zeit~lang,1,0,15,0,5
zeit~lebens,0,1
zeit~lich,6,5
zeit~lupe,1,0,15,0,5
zeit~lupentempo,1,0,15,0,5
zeit~messer,1,0,0,4,5
zeit~plan,1,0,7,4,5
zeit~plane,1,0,15,0,5
zeit~raffer,1,0,15,4,5
zeit~raubend,6,5
zeit~raum,1,3,7,4,5
zeit~rechnung,1,0,2,0,5
zeit~räume,1,0,15,0,5
zeit~schrift,1,0,2,0,10
zeit~tafel,1,0,0,4,5
zeit~ung~,1,0,2,0,10
zeit~ung~sanzeige,1,0,1,0,5
zeit~ung~sausschnitt,1,0,7,4,5
zeit~ung~shändler,1,0,0,4,5
zeit~ung~sjunge,1,0,1,0,5
zeit~ung~skiosk,1,0,7,4,5
zeit~ung~spapier,1,0,7,4,5
zeit~ver~schwendung,1,0,2,0,5
zeit~vertreib,1,0,7,4,5
zeit~weilig,6,5
zeit~weise,0,1
zeit~wort,1,3,8,4,5
zeit~wörter,1,0,15,0,5
zeit~zeichen,1,0,0,4,5
zeit~zone,1,0,1,0,5
zeit~zünder,1,0,0,4,5
```

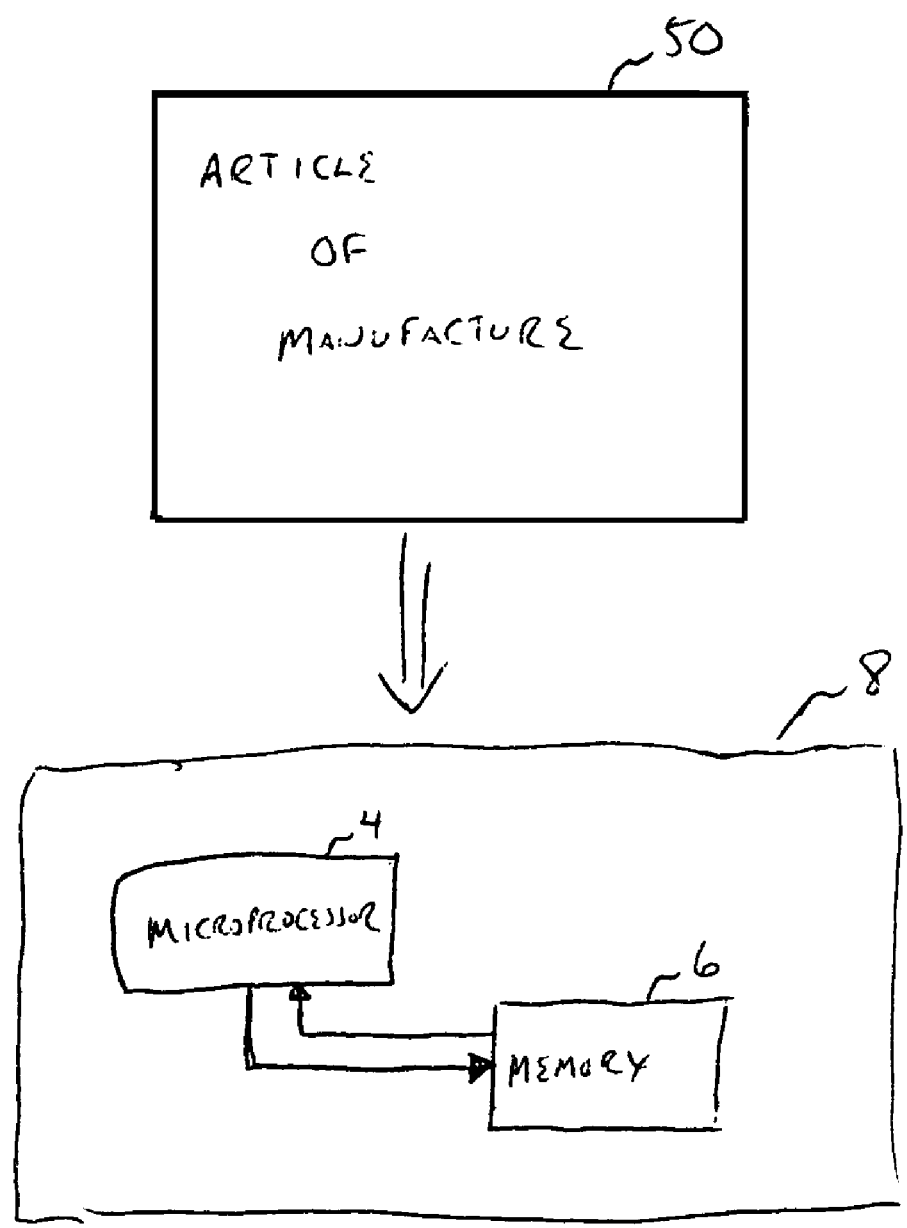

ns on individual words can cause a similar difficulty to existing word prediction systems in reducing the number of words offered to the operator after a base word has been chosen.

LINGUISTIC RETRIEVAL SYSTEM AND METHOD

BACKGROUND OF THE INVENTION

1. Field of the Invention

This invention relates generally to linguistic retrieval systems and more specifically to word prediction systems.

2. Description of Related Art

Known word prediction systems operate based solely upon input letter activations. As each letter or group of letters is input to the system, a list of words is offered to the operator for selection. The list of words offered to the operator may be ordered by a designated frequency of use, by a general alphabetic order, or by a combination thereof. The list of displayed words can be modified by entering a next letter of the desired word. As such, a desired word (if stored in the word prediction database) is eventually displayed as a word choice; but it may take the entry of several letters of the desired word before it eventually appears on the list (or the typing of the entire word, if it is not stored in the word prediction database).

As an example, if the user desires to output the word "apple", the user first inputs an "a". The system then gathers and displays a predetermined number of words (for example, six), beginning with the letter "a". These six displayed words may be the first six words alphabetically stored under "a" in a database including "aardvark"; "aback"; "abacus"; "abaft"; "abalone" and "abandon", for example; or may include frequently used words beginning with the word "a". Thus, unless "apple" is a frequently used word which automatically appears as a selection upon inputting the letter "a", it may take the entry of several letters in the word before the word "apple" appears as one of the six words for selection. A user might have to enter "app", before the word "apple" appears as a selection and thus it will require at least four hits (three hits for each of "a", "p", and "p", and one additional hit to select the displayed word "apple") for someone to select the word "apple" using a known word prediction system.

The problem with known word prediction systems is that they require many keystrokes to access a word. Speech synthesis systems which utilize word prediction, for example, need to minimize keystroke activation necessary to access a word, as the people using such systems may be, and typically are, cognitively impaired in some way. It is difficult for people with diseases such as ALS, commonly known as Lou Gerrig's disease, to make these selections and it is further difficult for such people to retain the level of concentration necessary to remember the word which he or she is trying to obtain through word prediction, let alone to remember the context in which the word is to be used in a sentence or conversation. Thus, a need exists for the creation of a simple word prediction system which minimizes the number of keystrokes necessary to access a word.

Highly agglutinating and inflection languages pose an even greater problem to existing word prediction systems. A highly agglutinating language such as the German language, for example, is one in which words are combined fairly freely into larger words, and one which makes use of agglutination as its most productive strategy of lexical expansion. Since highly agglutinating languages contain large sets of words all beginning with the same letters and, more importantly, the same groups of letters, the reduction of a list of words offered or predicted to an operator to a manageable set becomes nearly impossible using known word prediction methods. In addition, multiple suffix inflec- Although known word prediction systems for accessing words stored in a database allows a considerable enhancement over straight spelling, highly agglutinating languages such as German cannot be efficiently handled with such current word prediction systems. Such word prediction systems for highly agglutinating language would contain a large number of entries all beginning with the same long sequence of letters. For example, in a sample database, 198 words beginning with "zeit" were counted. In such a situation, "z", "e", "i", and "t", have to be entered to even begin narrowing down the list of choices to reach a desired word such as "Zeitungskiosk" (meaning "newspaper stand"). For example, even after a fifth letter "u" is typed (thus, after five key activations), the following traces remain:

zeitung zeitungen zeitungsanzeige zeitungsanzeigen zeitungsausschnitt zeitungsausschnitts zeitungsausscbnitten zeitungshandler zeitungshandlers zeitungsjunge zeitungsjungen zeitungskiosk zeitungskioske zeitungskiosks zeitungskiosken zeitungspapier zeitungspapiere zeitungspapiers zeitungspapieren To continue to narrow down the choices, the letters "n", "g", "s", and "k" (nine key activations) must be typed before the display will reach the following four choices:

zeitungskiosk zeitungskioske zeitungskiosks zeitungskiosken

Finally, from the four words listed above, the word "zeitungskiosk" can finally be selected. Thus, ten key activations are necessary to access such a word utilizing known word prediction systems in a highly agglutinating language such as German. Accordingly, a need exists for enhancing current word prediction systems, especially when used in highly agglutinating languages such as German.

SUMMARY OF THE INVENTION

The present invention is directed to a system, method and article of manufacture which solve the above-mentioned and other problems with existing word prediction systems. The system, method and article of manufacture of the present invention utilize word chunks to enhance word prediction. At least one of selectable words and word chunks are displayed in response to receipt of an input character. Thereafter, a selection of at least one of a displayed word or word chunk is received, and in response to receiving selection of a displayed word chunk, selectable words including the selected word chunk are displayed. Using these word chunks, word prediction is enhanced and the number of keystrokes necessary to access a word is reduced, especially in highly agglutinating languages.

A word chunk preferably includes a word portion used in the formation of other words and a predetermined identifier, identifying it as a word chunk. Thus, the combination of chunking of parts of agglutinated words in combination with single letter input activations reduces the overall number of input activations necessary to access a word, and further reduces the amount of choices to select from at any point during retrieval of the word. Accordingly, for highly agglutinating languages such as German, for example, word chunks can be used to speed up word prediction and thereby eliminate unnecessary, time consuming, and sometimes difficult inputting of many individual characters.

In another preferred embodiment, the system, method and article of manufacture of the present invention use word chunks by first displaying at least one of selectable words and word chunks including an input character, in response to receipt of the input character. Thereafter, if a word chunk is selected, an input character is replaced with a selected word chunk. Then, the selected word chunk is used in place of the input character for further word prediction.

BRIEF DESCRIPTION OF THE DRAWINGS

The present invention will become more fully understood from the detailed description given hereinbelow and the accompanying drawings which are given by way of illustration only and which are not intended to limit the present invention in any way, wherein like reference numerals represent like elements and wherein:

FIGS. 4a to 4d are example display screens illustrating the chunking feature of the present application;

FIG. 5 is an exemplary database used in conjunction with the system of the present application;

FIG. 12 is an illustration of an article of manufacture of the present application.

DETAILED DESCRIPTION OF THE PREFERRED EMBODIMENTS

Figure 1:
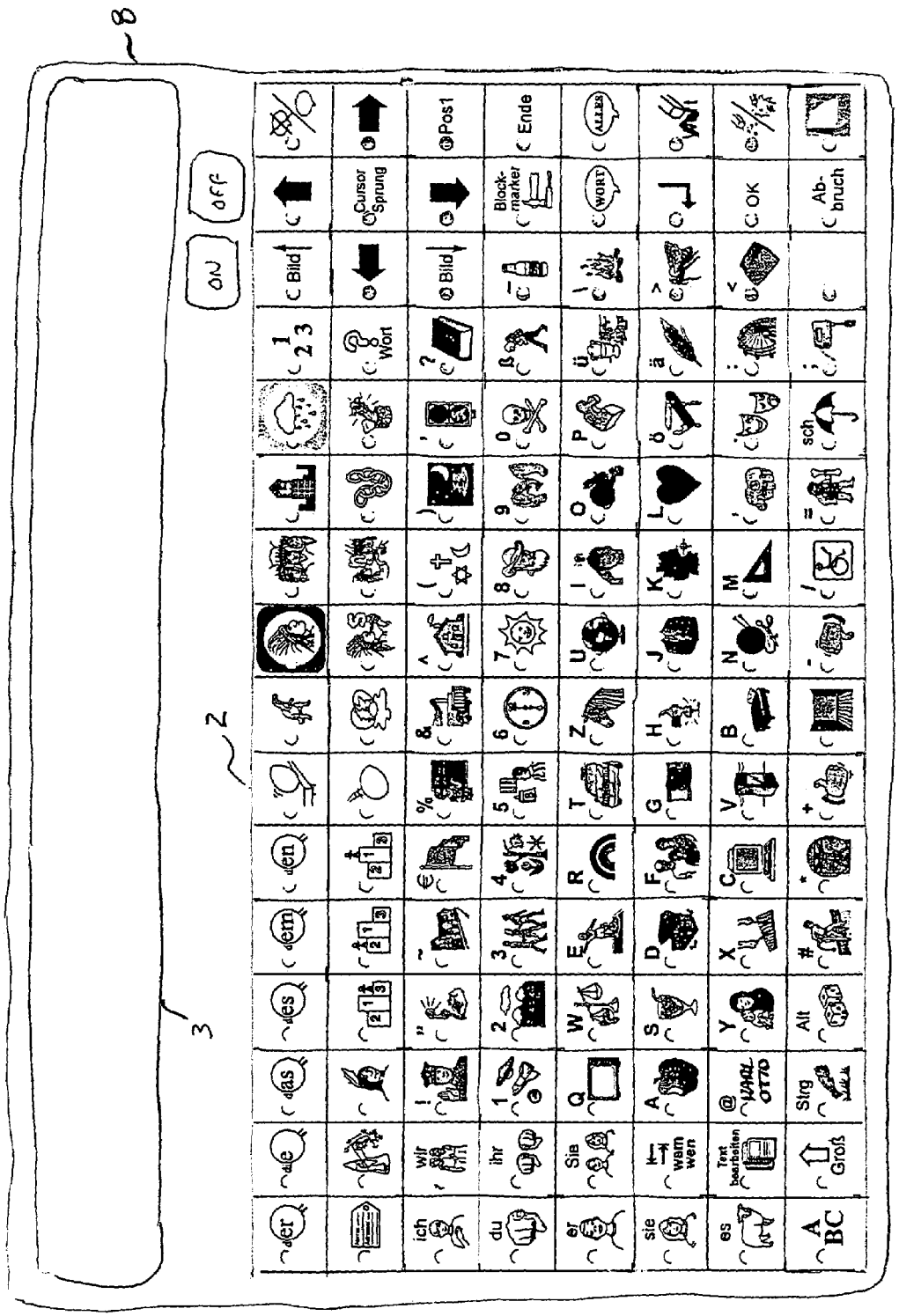
FIG. 1 illustrates a preferred embodiment of the system of the present invention, including an exemplary German language keyboard.

FIG. 1 is an illustration of a system 8 of the present application. This system 8 will be described hereafter in conjunction with a speech synthesizer, and specifically a speech synthesizer including both a symbol sequencing mode and spelling mode to access and output words. However, the word prediction and morphing aspects of the present application should not be considered limited to speech synthesizers and especially not to speech synthesizers having multiple symbol sequence and spelling modes. The word prediction and morphing aspects to be described hereafter can be applied to any word prediction system, or any other types of word prediction software, and is not limited to any specific type of input device, output device, display, or other specific hardware.

The system 8 preferably includes a keyboard 2, such as the exemplary keyboard shown in FIG. 1; and a display area 3. The keys on the keyboard 2 can include word endings, polysemous symbols or icons, alphabetic letters, numbers, word endings, single meaning symbols or icons, etc. The symbols or icons may be utilized, in various combinations, to access prestored words or messages in a manner similar to that described in U.S. Pat. No. 4,661,916; U.S. Pat. No. 5,097,425; and/or U.S. Pat. No. 5,297,041, each of which is incorporated herein by reference in their entirety and for all purposes.

The system 8 preferably includes at least two modes, one mode being a spell mode wherein characters such as alphanumeric characters can be entered to spell words. In this mode, word prediction, including the chunking aspect of the present application, is normally utilized. In the other mode, symbols are combined to access stored words or phrases in the manner set forth in any of U.S. Pat. Nos. 4,661,916; 5,097,425; and 5,297,041. This system preferably can automatically switch between the alphabetic character input or spelling/word prediction mode, and the icon or symbol sequencing mode in a manner set forth in U.S. Pat. No. 5,210,689, which is also incorporated herein by reference in its entirety and for all purposes.

Figure 2:
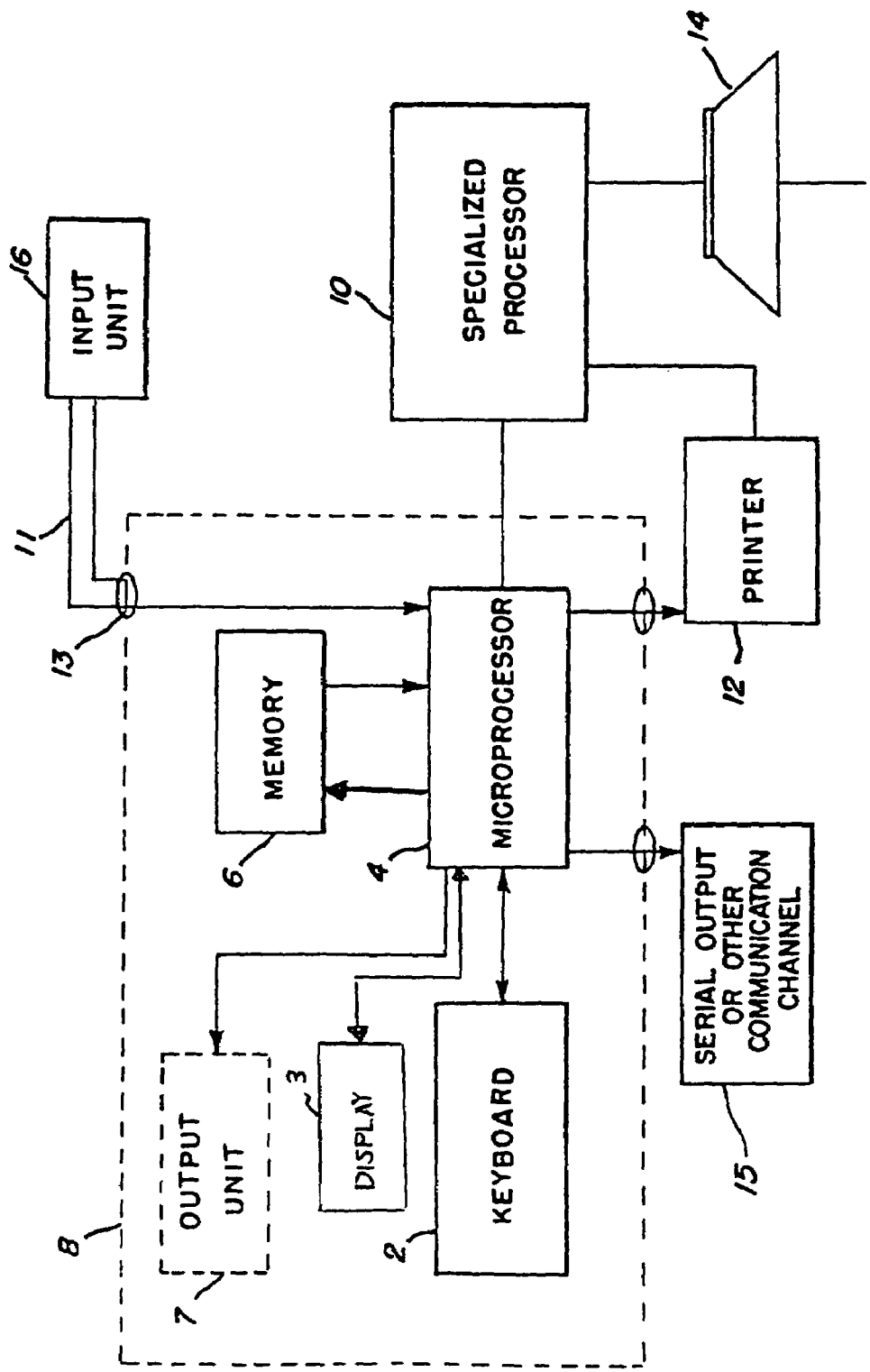
FIG. 2 illustrates hardware details of the system of the present invention in conjunction with a specialized processing system and various input and output units.

FIG. 2 illustrates exemplary hardware of the system 8 of the present invention. The system 8 preferably includes a microprocessor 4, acting as a controller. The microprocessor 4 is connected to each of a memory 6, the keyboard 2, and the display 3. The microprocessor 4 performs the various operations set forth in FIG. 3, for example, and receives inputs from the keyboard 2 and/or the display 3 (noting that the display may include an integrated touch panel/display device, for example). The microprocessor 4 accesses the memory 6, which can include random access memory (RAM); read-only memory, such as electronic erasable programmable read-only memory (EEPROM); and other types of memory components. The memory 6 preferably stores word prediction software which will be described in conjunction with FIG. 3. The word prediction software operates to direct the microprocessor 4 to access a database, preferably stored in another section of memory 6, such as that shown in FIG. 5 of the present application.

The system 8 of the present application is further preferably used as a speech synthesizer, in conjunction with a specialized processor 10 for outputting audio signals through a speaker 14 and/or for outputting information to printer 12, wherein the printer 12 can alternately be directly connected to microprocessor 4, for example. The system 8 of the present application as shown in FIG. 2, further preferably includes a serial output or other communication channel 15, as well as a port 13 for preferably connecting, through wires 11 or through some wireless medium, to an input unit 16. Finally, an additional output unit 7 can also be connected to microprocessor 4. It should be noted that the specialized processor 10 may be omitted, with the system 8 of the present application outputting processed information directly through speaker 14, printer 12, or communication channel 15; as well as directly to display 3 and/or output unit 7. Any or all of the output channels of the system 8 of the present application can be selected to output a given message.

The system 8 of the present application may include an output unit 7. This may be one of a processor and speaker to generate audible sound waves; a light source matrix with individually controlled lights; or any similar type of output device or combination of devices which can be utilized in conjunction with one of a plurality of different input devices 16. The input device 16 may be one or more of a plurality of input devices utilized in conjunction with optional output device 7 and microprocessor 4 to activate signals corresponding to a plurality of key activations from the keyboard and/or touch panel display 3 and thus may indicate selection of a particular key.

The processor 10 may be a language translator, voice synthesizer or any similar-type processor which may process plural word messages, or spelled or word prediction selected messages desired to be output by a user. Words may be accessed from the database (or morphed) through the symbol sequence key activation, or through spelling, which may or may not involve word prediction and selection. Words can individually be generated and output; and/or words can be accumulated on display 3 and then eventually output in sentence form, paragraph form, etc.

Specialized processor 10 is preferably a microprocessor controlled speech synthesizer. The synthesizer is preferably a high quality synthesizer that is easily understood by the user. The specialized processor 10 may be one of a commercially available speech synthesizers such as the Votrax Speech SPAC with the SC-01 voice synthesizer chip therein, marketed by Votrax; the Dec-Talk; the Smooth Talker; etc.

The system 8 as shown in FIGS. 1 and 2 can further utilize icon or symbol prediction as described in U.S. Pat. Nos. 5,097,425 and 5,297,041. Each of the keys shown on keyboard 2 of FIG. 1 preferably include some type of visual indicator or light, which may be light-emitting diodes (LEDs) for example. As described in the aforementioned U.S. patents, in an icon prediction mode, once one icon has been selected which is used in forming a prestored symbol sequence, all available next icons which will form or add to a symbol or icon sequence used to access a stored word or message, will have their corresponding light indicators lit up. The device thus creates either a manual prediction mode, wherein all available next-icons in the sequence will have their corresponding indicators light up; and/or a row-column or matrix scanning mode wherein light indicators of available next-icon will light up on a row-by-row, column-by-column, or sector-by-sector basis for subsequent access by the user.

The input device 16 can be used in any of the row-column scanning or a manual input mode in any known manner. For example, the input device may be a switch which is used to actuate certain keys on keyboard 2, such as any kind of switch which, when activated by the user, sends a signal to the microprocessor 4 equivalent to a key actuation. The switch may be one activated by the user's breath (a puff switch); by the user's tongue, by movements of the user's head, etc. A particular type of switch utilized as input unit 16 can be any type of switch suited to a user's needs and abilities. Alternatively, direct actuation of keys on keyboard 2 may be achieved by the user using his/her finger, a head stick, or any other desired method to directly actuate the appropriate keys and or a touch panel display device.

As previously set forth, an aspect of the present application involves a solution to the problems of utilizing word prediction in a highly agglutinated language. Thus, although the system 8 of the present application may utilize a symbol or icon sequencing mode; as well as a character spelling and word prediction selection mode, the discussion hereinafter will focus on the character input mode wherein word prediction is traditionally utilized. Further, it should again be noted that while the word prediction system, method and article of manufacture of the present application are preferably utilized in conjunction with the system 8 as shown in FIGS. 1 and 2 for example, it should not be limited as such. The techniques described hereinafter can be used in conjunction with any word prediction system, or any other system utilizing word prediction technology, irrespective of whether or not the system is used for speech synthesis, also utilizes symbol or icon sequences, etc.

Figure 3:
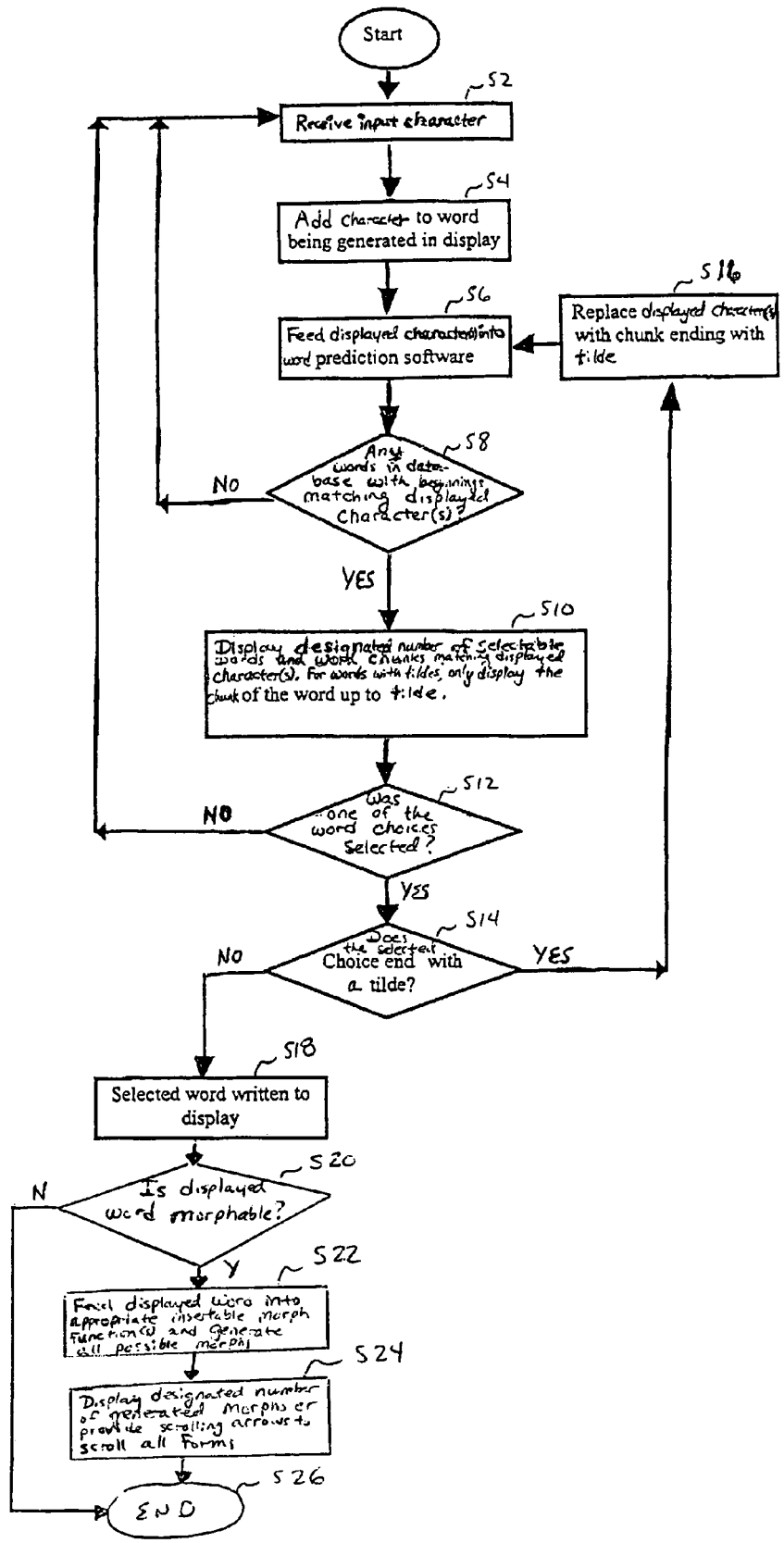
FIG. 3 is a flowchart of the methodology of the present application utilizing the word chunking feature.

FIG. 3 illustrates an example of the methodology followed by the word prediction method, system and article of manufacture of the present application. Initially, in Step S2, an input character is received. Typically, this character is an alphabetic character, such as a letter of the alphabet. Alternatively, the input character could be a symbol or even a symbol sequence.

Thereafter, in Step S4, the character is added to the word being generated in display 3. In other words, as a particular character is input, it is preferably displayed in display 3. If it is the first letter of a word, for example, then that first letter is displayed in display window 3 and words will be predicted based upon this letter. If it is the second letter entered, then it is added to the first letter in Step S4, and the first and second letter combination will be used in word prediction.

After Step S4, the displayed character(s) are fed into the word prediction software in step S6. This input character(s) is then used in word-prediction as follows.

Word prediction essentially begins in Step S8, wherein a database stored in memory 6 is checked for words beginning with the input character(s). As stated in Step S8, it is determined whether or not any words in the database exist with beginnings matching the display character(s), i.e., are there any words stored in the database which begin with an input letter or letters? If not, the system returns to Step S2 and awaits input of an additional character. If so, the system moves to Step S10.

In Step S10, once words are found in the database with beginnings matching the input and displayed character(s), a designated number of selectable words and word chunks matching the display and input character(s) are displayed in display window 3. Such a designated number can be 6, for example, or any other number. Alternatively, a much larger number of words and/or word chunks can be retrieved, with a certain number of word and/or word chunk selections being displayed at one time with the others being accessible in a scrolled manner.

For words in the database including a predetermined identifier identifying the word as a word chunk, only the chunk of the word up to the predetermined identifier is displayed. A word chunk includes a word portion used in the formation of other words and includes a predetermined identifier, identifying it as a word chunk. Preferably, the predetermined identifier is a tilde. Thus, in Step S10, a designated number of selectable words and word chucks matching the displayed and input character(s) are displayed for selection, and for words in the database including the tilde symbol, only the chunk of the word up to the first tilde is displayed.

The designated number of selectable words and word chunks matching the displayed character(s) is often designated based upon a screen size of the display 3 for example. Typically, in a word prediction system, six words are initially displayed in response to a receipt of an input character. Even more preferably, six selection windows are displayed, wherein the last of the selection windows includes an arrow when more than six words are found which match the input character(s). This arrow will allow the user to scroll to additional screens to view additional words.

Accordingly, in Step S10, assuming that the designated number of selectable words and word chunks is six, then six words or word chunks will be displayed if six word or word chunks are found matching the display of an input character(s). The system, method and article of manufacture of the present application are not limited to display of a designated number of selectable words or word chunks matching the displayed and input character(s), and can display all matching word and word chunks in a scrolled fashion, for example. Further, the display is not limited to the display of both words and word chunks, as such a display can include only words or only word chunks, if these are found to match the input character(s). Thus, in Step S10, the word prediction method of the present application displays at least one of selectable words and word chunks in response to receipt of an input.

Thereafter, in Step S12, it is determined whether or not one of the word choices (including words and/or chunks) was selected (through use of an input device such as a keyboard, touch screen, etc.). If not, the system cycles back to Step S2 and awaits receipt of an additional input character. Thus, instead of selecting one of the displayed word choices, a user can merely decide to enter a second input character in Step S2 and then utilize the word prediction aspects of the present application with a larger and more precise character string including two or more letters.

If a selection of the displayed word choice is made in Step S12, namely a word or word chunk, it is received by a microprocessor 4 and the methodology proceeds to Step S14. In Step S14, the microprocessor 4 determines whether or not a selected word choice is one with a predetermined identifier, which would identify it as a word chunk. For example, in Step S14, it is determined whether or not the selected choice ends with a tilde. If it does not, then an actual word has been selected and in Step S18, and the selected word is written to the display (or morphs are generated as will be explained later), and the system returns to start to await input of another character to again begin the word prediction process. However, if the selected choice does end with a predetermined identifier identifying it as a word chunk in Step S14, such as a tilde for example, the system proceeds to Step S16. In Step S16, the input and displayed character(s) is replaced with the word chunk ending with the predetermined identifier, such as the tilde. Thereafter, in response to receiving selection of the displayed word chunk, the system proceeds back through Step S6 wherein the word chunk will now be used in place of the input character(s) for word prediction and is thus sent to the word prediction software in Step S6. Thus, in response to receipt of an input character, at least one of the selectable words and word chunks including the input character are displayed; and in response to a word chunk being selected, the input character is replaced with the word chunk, with the word chunk being used for further word prediction. Thereafter, in Step S8, the database will be searched for words beginning with the selected word chunk and words and word chunks including the selected word chunk will be displayed for selection.

Accordingly, by inputting only one character and by selecting only one word chunk (two keystrokes), the system will be able to display, in Step S10, a plurality of selected words or word chunks, including the entire word chunk selected in Steps S12–S18. Such an aspect of the present application is extremely valuable in highly agglutinating languages, since it essentially eliminates the need to input a plurality of characters before being able to predict a desired word.

Further, if the words including the selected word chunk include other words including an additional identifier identifying a next word chunk, the system will display these new word chunks up to what essentially is a second predetermined identifier or tilde. For example, if the selected word chunk is "zeit~", while many complete words may be displayed which include the word chunk "zeit", further words including an additional "chunk" may also be displayed. For example, assuming the chunk "zeit~" is selected, the new second level word chunk "zeitung~" may be displayed. By allowing the system to move through the word prediction process on a chunk-by-chunk basis, the word prediction system, method and article of manufacture of the present application can be used to rapidly predict words, even in highly agglutinating languages (by chunking parts of the agglutinating words). Such a system, method and article of manufacture is therefore highly valuable in such languages, such as the German language, for example. Thus, most preferably, the words and word chunks are in an agglutinated language.

Thus, at least one of selectable words and word chunks are displayed in response to receipt of an input character. Thereafter, a selection of a displayed word or word chunk is received. In response to receiving selection of a displayed word chunk, at least one of selected words and word chunks including the selected word chunk are displayed. In response to receiving selection of a displayed word, at least one morph of the selected word is displayed if possible.

Steps S20 to S24 are directed to the generation of "morphs", namely the various inflection forms of words. Accordingly, after a word is selected in Step S18, it is determined in Step S20 if the word is morphable, namely it is determined whether or not "morphs" of the displayed word can be generated. If not, the system ends in Step S26 and essentially awaits input of a new character to begin word prediction all over again in Step S2.

If the displayed word is "morphable", the displayed word is fed into an appropriate insertable morph function(s) and all possible morphs are generated in Step S22. These insertable morph functions can include the insertable morphing methodology of FIG. 6 for nouns; and/or the insertable morphing methodology for adjectives and verbs of FIGS. 7–10. Each of FIGS. 6–10 will be discussed in more detail at a later time.

Generally, the insertable morphing functions are used to generate all possible morphs or inflection forms of the displayed and selected word. Stored morphing data, stored along with various ones of the words in a database of memory 6 such as that shown in FIG. 5 for example, is used to determine which insertable morphing functions will be used to generate morphs of the stored words. The use of this morphing data and the specific insertable morphing methodology for nouns, verbs and adjectives will be discussed hereafter. In the word prediction mode, the word prediction software feeds the insertable morphing functions repeatedly with a list of all possible parameters to generate the whole conjugation or declension of a word, and thereafter offers each of the various generated forms (morphs) as choices. Thus, in Step S24, the designated displayable number of generated morphs (if any are possible), or all forms of the morphs (by the use of scrolling arrows) are provided so that a user can thereafter select and display any of the particular morphs without having to enter anymore characters into the system. Accordingly, after Step S24, a desired morph of the word may be selected, and if no such morph is selected, the system defaults to the selected word written to the display in Step S18. An example will be discussed in detail hereafter, illustrating the significance of the methodology of FIG. 3 of the present application.

An example of the system, method and article of manufacture of the present application will be discussed in an exemplary format, utilizing words in the German language. German is a highly agglutinating language and extremely useful in highlighting the advantages of the methodology of the present application as previously discussed with regard to FIG. 3. However, the present application is not limited to the German language or even to highly agglutinating languages since the chunking process can be applied to any and all languages.

Figure 4A:
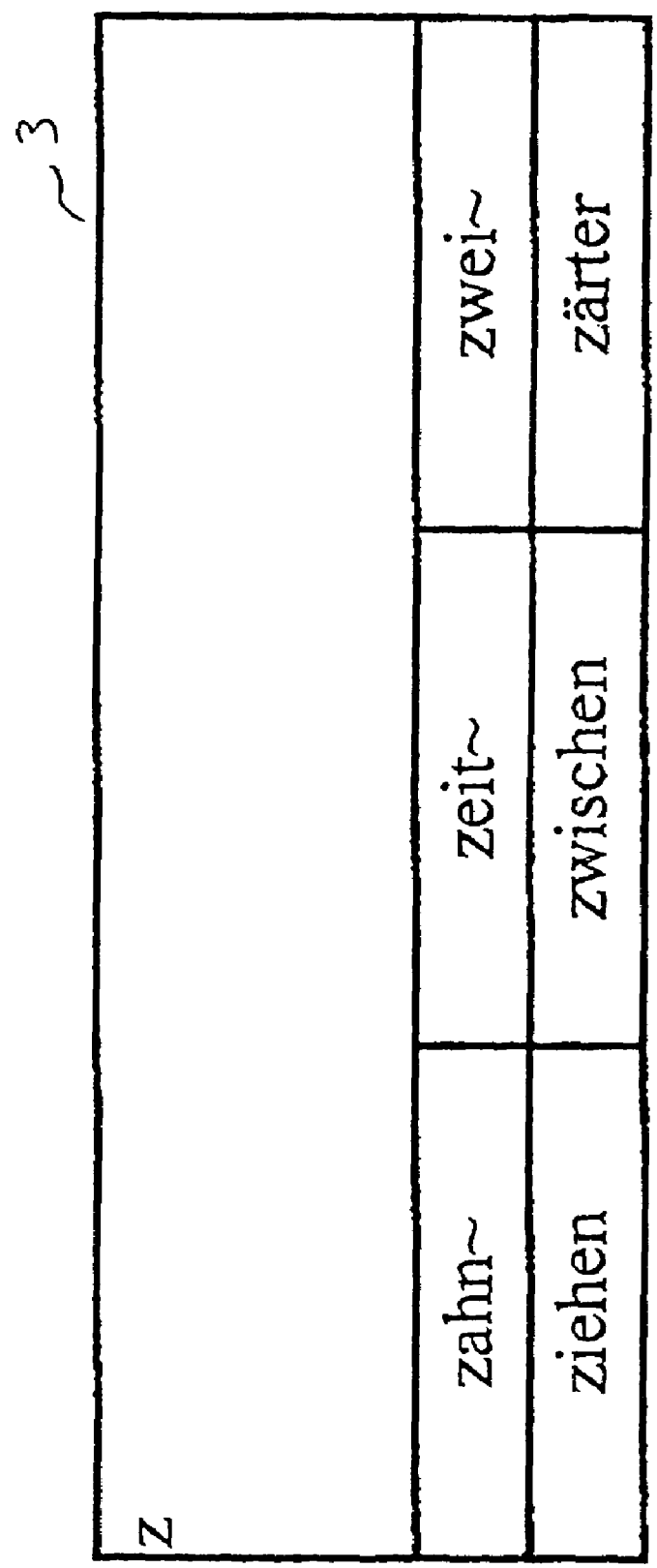

Initially, it is assumed that a user inputs a first character into the system, via keyboard 2 for example. In this example, the letter "z" is input and received by microprocessor 4. The input character "z" is displayed in display 3 as shown in FIG. 4a for example. Thereafter, the microprocessor 4 checks the database stored in memory 6 for word and word chunks matching the display character. In the example shown in FIG. 4a, the microprocessor 4 checks the database stored in memory 6 for words and word chunks beginning with the letter "z".

Once these word and word chunks are located, a designated number of selectable word and word chunks matching the display character are displayed as shown in FIG. 4a. In the example shown in FIG. 4a, the designated number of selectable words and word chunks is six. The actual words and word chunks selected based upon the input and received character can be first words alphabetically stored, or they can be displayed based upon frequency codes stored in the database as memory 6. These frequency codes will be discussed in more detail at a later time, but suffice it to say that they include codes stored in association with words and word chunks in the database stored in memory 6. Words or word chunks associated with an input character and including a relatively high frequency code will be displayed before words and word chunks associated with the same input character and a relatively low frequency code. As such, instead of merely presenting the six alphabetically listed word or word chunks corresponding to the input character, frequency codes can be used so as to ensure output of the most common or most frequently used words or word chunks beginning with the input character(s) or selected word chunk.

As shown in the example of FIG. 4a, upon receipt of the input character "z", the microprocessor 4 searches the database and uncovers six selectable choices, three of which are words and three of which are word chunks. Each of the word chunks includes a word portion used in the formation of other words and includes a predetermined identifier, identifying it as a word chunk. In the example shown in FIG. 4a, the word chunk is identified by the tilde symbol.

Each of these six choices are thus presented to the user for selection. If one of the three words is selected, the selected word may be written to the display or morphs of the selected word may be determined and displayed for selection. The selection may be made by use of a corresponding key on the keyboard, through some other input device, or through the display 3 being an integrated touch panel display.

As can be seen by the example shown in FIG. 4a, by inputting a single character, the user can find a word beginning with a word chunk such as "zeit". Discovering such a word chunk might require up to four key entries in the known word prediction systems, but by utilizing the word chunking of the present application, it is uncovered by a single key actuation.

Thereafter, as shown in FIG. 4b, it is presumed that the user selects the word chunk "zeit~". Since the selected choice ends with the predetermined identifier, the tilde in this case, the displayed character "z" is replaced with the word chunk "zeit~", ending in a tilde. Thereafter, word prediction continues using the word chunk "zeit~", and the microprocessor 4 now searches the database for a word or word chunks beginning with "zeit". As shown in the example of FIG. 4b, as a result thereof, five words are retrieved and displayed, along with another word chunk. This new word chunk includes the first word chunk. The new word chunk in the example of FIG. 4b is "zeitung~".

Figure 4C:
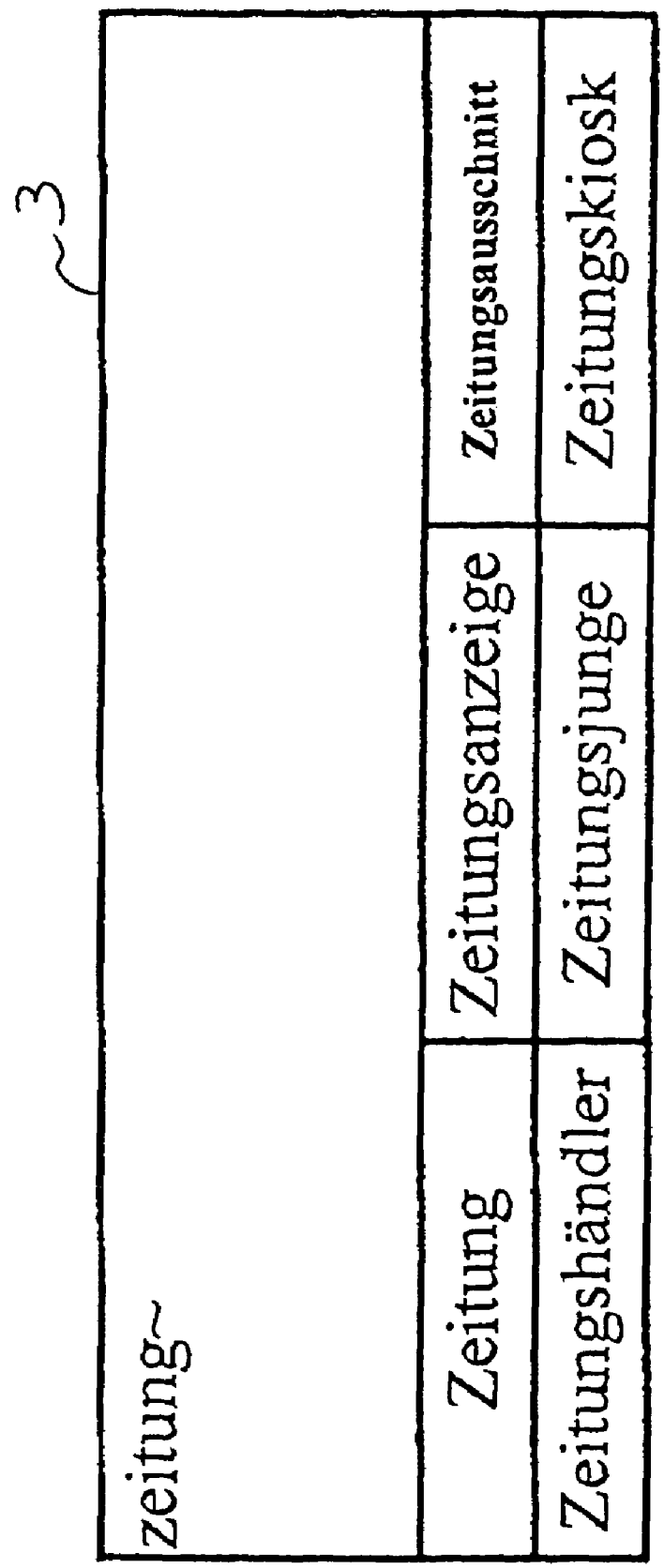

Upon selecting the word chunk "zeitung~", as shown in FIG. 4c, "zeitung~" replaces the displayed characters or word chunk of "zeit~" as shown in FIG. 4b. Thereafter, word prediction continues with the new word chunk "zeitung~", wherein the database is searched for various words and word chunks beginning with the "zeitung" word chunk. As such, "zeit~" is able to be accessed in two actuations, and "zeitung~" is accessed in only three actuations (despite the fact that this is a seven letter word). As can be seen, such a process permits swift access of various word and word chunks, even in this highly agglutinated language.

In response to receiving input of the word chunk "zeitung~", the word processing system then outputs six selectable words. From these six words, the user can make his desired final selection of the word "zeitungskiosk" (meaning newspaper stand) in only four key actuations. Utilizing normal word prediction software, it would have taken a few key actuations to reach even the word "zeit", around seven key actuations to reach the word "zeitung", and around at least eight key actuations to reach the requested word "zeitungskiosk". By utilizing the chunking aspects of the present application, such key strokes are cut in half.

To increase the effectiveness of the system, method and article of manufacture of the present application, additional information may be stored with words and word chunks in the database to generate inflected words or morphs as choices in the word prediction window. This requires fewer entries in the database and thus a reduced amount of memory, as will be explained as follows.

As shown in FIG. 4c, upon selection of the word chunk "zeitung~", one of the six selectable word choices is "zeitungsausschnitt". Upon selecting this word, the selected word can be written this way. However, if additional information known as "morphing codes" are stored in the database along with the selected word, the system then generates inflected words or morphs as additional choices in a new word prediction window, upon receiving an indication that the word is selected. For example, as shown in FIG. 4d, if the word "zeitungsausschnitt" is selected, the microprocessor 4 locates various morphing codes stored in association with the word in the database of memory 6. When such morphing information is found, inflected forms of the word known as "morphs", are generated using insertable morphing functions such as that shown in FIGS. 6–10, and are offered as choices in the word prediction window of display 3. Thus, the various forms of "zeitungsausschnitt" need not be separately stored in the database, and instead the insertable morphing functions are used in conjunction with stored morph codes to automatically generate "morphs" of the selected word as selectable word choices. This aspect of word prediction with regard to noun-morphing will be discussed in FIG. 6; with regard to adjective morphing will be discussed with regard to FIGS. 7, 8a and 8b; and with regard to verb morphing will be discussed with regard to FIGS. 9a–c and 10a–b. It should be noted that while "morphing" is preferably used in conjunction with the "chunking" type word prediction of the present application, it should not be limited as such. It can be applied to any type of word prediction system. Further, it can be applied to other systems such as symbol or icon sequencing systems which use icon sequences to output the general form of a word, to minimize storage.

Accordingly, morphing generally applied to any system involves displaying a plurality of selectable words beginning with an input character; determining whether or not morphing data is stored in association with a selected word; morphing the selected word in response to determining that morphing data is stored in association with the selected word; and displaying morphs of the selected word for further selection. Preferably, the morphing data is stored in association with various words in a database. The morphing data preferably includes morphing codes indicating a part of speech of the word, with the selected word being morphed based upon the part of speech, as will be described hereinafter.

FIG. 5 is an example of a database storable in memory 6. The database includes many words and word chunks beginning with the word chunk "zeit~". Accordingly, once the "zeit" is entered and received, the microprocessor 4 will access the database to output only the word chunk "zeit~". Thereafter, once the word chunk "zeit~" is selected, additional words and word chunks will be output based upon frequency codes, for example, stored in the database and shown as numerical values in FIG. 5. When displaying the word including a tilde, after selection of "zeit~", the tilde will be removed. A tilde will only remain if the word includes a second tilde, wherein only the chunk of the word after the tilde will be displayed. For example, once "zeit~" is selected, "zeitalter" will be displayed as a single word. Further, if "zeitung~" is to be displayed, then words such as "zeitungsausschnitt" will only be displayed after "zeitung~" is selected.

In the example shown in FIG. 5, the various numbers or codes in the database correspond to information in various categories. Some of these codes include morphing data or morph codes. The first number stored after the word or word chunk indicates the word or part-of-speech category. The part-of-speech categories, which can be considered "morphing" codes since many times morphing functions to be applied to a word can be determined from the part of speech alone, can include, but are not limited to the following categories identified by the following numbers:

0=non-morphing word

1=noun

2=irregular verb part used as a noun

3=irregular verb part

4=regular verb

5=irregular verb

6=adjective

7=adjective lacking comparative and superlative forms

8=irregular adjective part

9=noun with multiple declensions

10=verbs with both regular and irregular forms

11=irregular verb part used as noun with multiple declensions

12=adjective and noun

13=adjective and noun lacking comparative and superlative forms

14=noun and non-morphing word

Thereafter, morphing data can be included. In the fourteen example categories discussed above, a second, third and fourth number listed in any of categories 1, 2, 9, 11, 12, 13 or 14 is directed to noun morphing data. In categories 4, 5, and 10, the second, third and fourth numbers correspond to a verb prefix data and generation of subjective forms in the morphing data. Finally, the final number listed for any word is a frequency number which is used to determine when words will be displayed.

Preferably, each word is stored in the database in association with at least a part of speech and frequency code. However, as the part of speech code can act as a morphing code, and as frequency codes need not be stored, only one code may be stored in association with a word to trigger morphing, if desired. Additionally, various other morphing codes may be stored in association with a word. These additional morphing codes may provide details to the morphing methodology to be applied.

Figure 6:
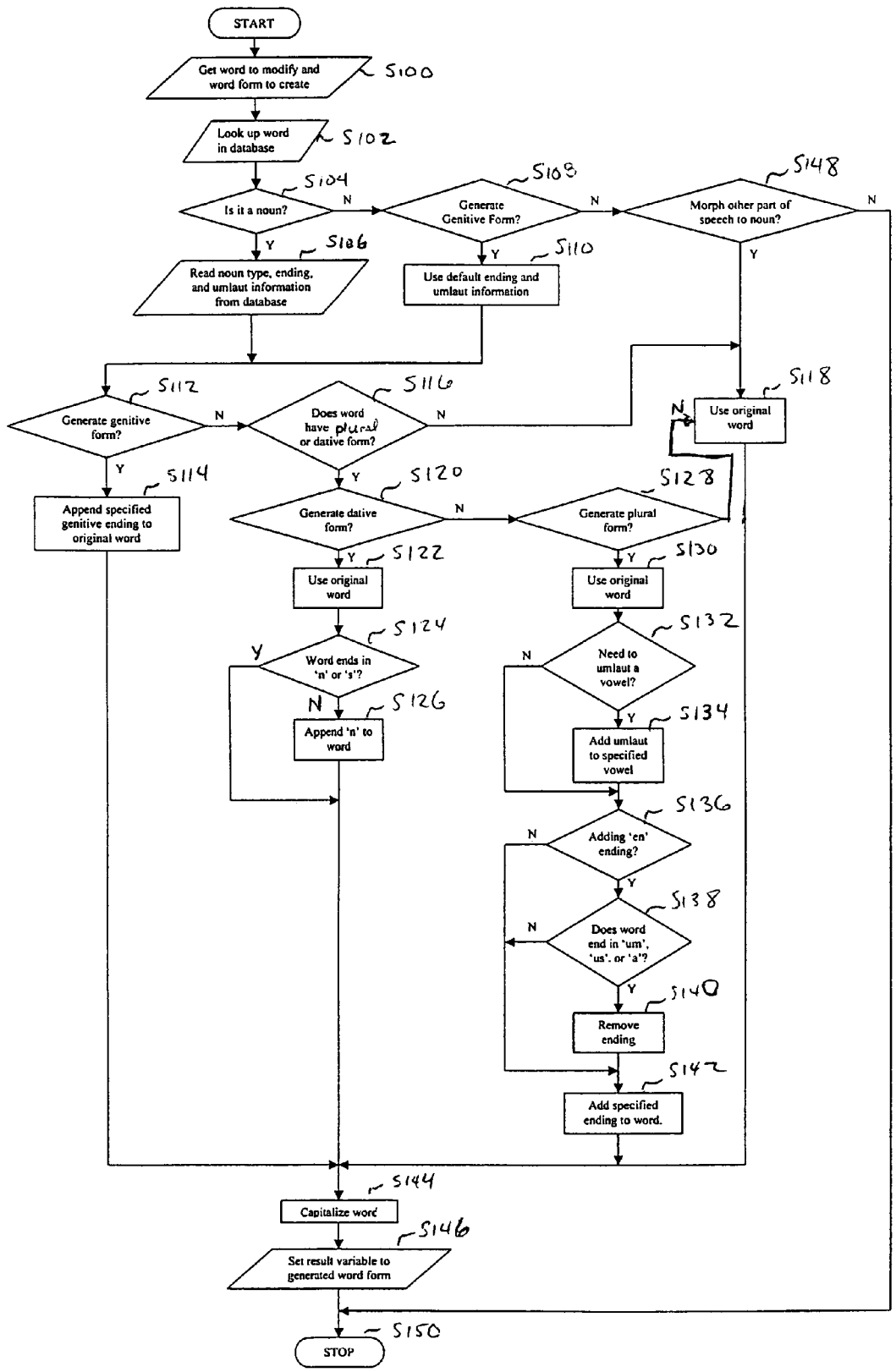
FIG. 6 is a flowchart illustrating exemplary methodology for executing noun morphing.

FIG. 6 is an exemplary aspect of insertable morphing methodology for nouns, as it applies to the German language. In German (and many other languages such as French, Italian, etc.), nouns have various endings depending on the gender of the noun (masculine, feminine and neuter) and depending on how the noun is utilized in a sentence. Accordingly, instead of storing the various forms of the noun in a database, morphing data is utilized to identify the word of a noun. In the example database discussed above, a first number "1" after a word indicates that it is a noun. Once this is discovered, other morphing information is utilized, following the flow process shown in FIG. 6, for example, to automatically generate and then display as selectable choices, various forms of the selected noun. It should be noted that the noun morphing process or insertable morphing methodology of FIG. 6 for nouns, and the insertable morphing methodology for adjectives and verbs of FIGS. 7–10 discuss the insertable morphing methodology used in the German language to generate morphs. However, the invention should not be considered to be limited to the German, French, Italian and other romance languages or even to other highly agglutinating languages, such as the Scandinavian languages (Swedish, Danish, Norwegian, etc.), as similar methodology could be designed and used by those of ordinary skill in the art based on rules of the particular language and the insertable morphing methodology disclosed herein. The example flowchart of FIG. 6 will be explained hereafter as follows.

Initially, in Step S100, the word such as "zeitungsausschnitt" is obtained in Step S100. The word is looked up in the database in Step S102 and microprocessor 4 determines whether or not the word is stored as a noun in the database in Step S104, utilizing the stored morphing data or information. If the word is stored as a noun, then the noun-type ending, and umlaut information is read from the database (based upon additional stored morphing data including the second, third and fourth noun morphing data numbers stored along with a noun).

If it is determined that the word is not stored as a noun in the database in Step S104, the system proceeds to Step S108 wherein it is determined from input data, whether or not a genitive form of the selected word should be generated. If input data indicates that a genitive form should be generated, a default ending and stored umlaut information (if any) is gathered in Step S110.

Following either of Steps S106 or S110, the system then proceeds to Step S112 where again it determines whether or not to generate the genitive form of the word based on input data. If so, in Step S114, the specified genitive ending is appended to the original word. If not, the system proceeds to Step S116 where it determines whether or not the word has a plural or dative form from information stored in the database. If not, the original word is output without being morphed by the microprocessor 4 in Step S118. If not, the system proceeds to Step S120 where it is determined whether or not to generate the dative form from input data. If so, the system proceeds to Step S122 and uses the original word. Thereafter, the system proceeds to Step S124 and determines whether or not the word ends in "n" or "s". If not, the system in Step S126, appends "n" to the word. If so, the system jumps from Step S124 to Step S144 wherein the word is capitalized (in this exemplary system, all nouns are capitalized). Thereafter, the result variable is set to the generated word form in Step S146 (i.e., the output or result of the process is stored for future use, such as for display as a morph of a word, by the software) and the system ends at Step S150.

In Step S120, if it is determined not to generate the dative form, the system moves to Step S128, wherein it is determined whether or not to generate the plural form based upon input data. If so, the original word is used in Step S130. If not, the system moves to Step S118 where the original word is used, etc.

After Step S130, the system moves to Step S132 to determine whether or not a vowel needs to be umlauted based upon morphing data. If so, an umlaut is added in Step S134 to a specified vowel. Thereafter, if it is determined that an umlaut is not needed in Step S132, the system proceeds to Step S136 wherein it is determined whether or not to add an "en" ending based upon morphing data. If not, the system proceeds to Step S142 and a specified ending is added to the word. If so, it is determined in Step S138 whether the word ends in "um", "us", or "a". The system then proceeds to Step S140 wherein the ending is removed. Thereafter, the system proceeds to Step S142 wherein a specified ending is added to the word.

Following Step S118, Step S142, Step S124, Step S126 and Step S114, the system proceeds to Step S144 where the word is capitalized. Thereafter, the system proceeds to Step S146 wherein the result variable is set to the generated word form (i.e., the output or result of the process is stored for future use, such as for display as a morph of a word, by the software). Finally, the system ends in Step S150.

The only remaining portion of the flow chart of FIG. 6 involves Step S148. If it is determined in Step S108 not to generate the genitive form, then the system moves to Step S148 where it is determined whether or not to morph another part of the speech to a noun. If so, the original word is used in Step S118, and the system proceeds to Step S144. If not, the system proceeds to Step S150 and stops there. Again, it should be noted that the aspect of noun morphing shown in FIG. 6 is one exemplary format utilized for a German language system, but it can be used for any language such as French, Italian, the Scandinavian languages, etc. Further, it is preferably utilized in combination with the word prediction system of the present application so as to generate word forms of an accessed word to the user without the need to separately store each of these varied forms.

Figure 7:
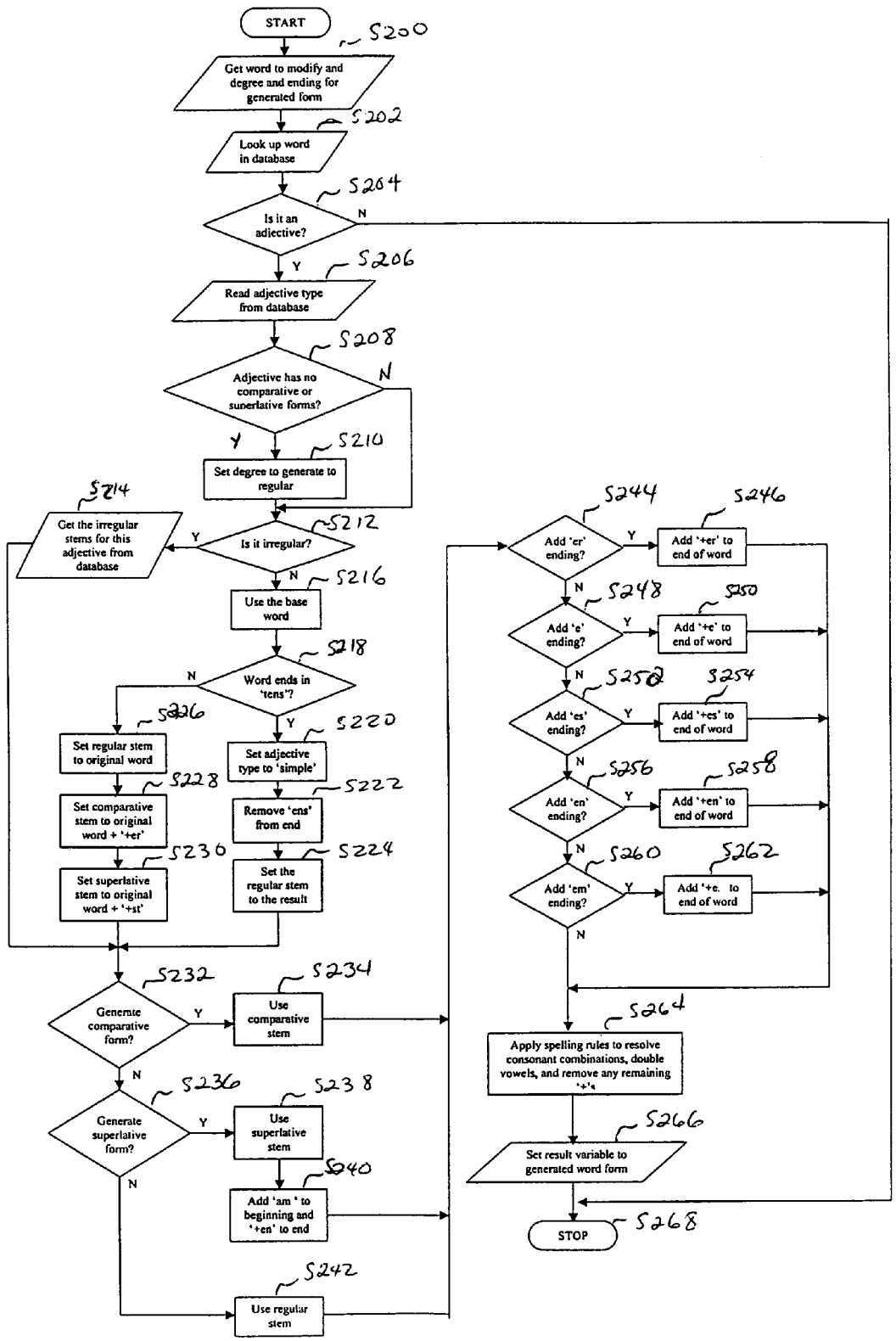
FIG. 7 is a flowchart illustrating exemplary methodology for adjective morphing.

The present application can also utilize an adjective morphing process or insertable morphing function for adjectives, such as that shown in FIG. 7, for example. Again, this is only an example directed specifically to the German language but should not be limited as such. Further, it utilizes morphing data such as that stored in the database shown in FIG. 5, for example. In the adjective morphing process shown in FIG. 7, the system initially begins with Step S200 wherein the word to be modified is retrieved, along with information indicating a degree and an ending of the generated form, noting that an adjective may have up to six different endings (none, -er, -e, -es, -en, -em) in the German language, and up to three degrees (normal, comparative and superlative) for example.

Thereafter, in Step S202, the word is looked up in a database, such as that shown in FIG. 5, for example. In Step S204, it is then determined from the morphing information stored in association with the word, whether or not the word is an adjective. If it is not an adjective, the methodology ends. If it is an adjective, the system proceeds to Step S206 wherein the adjective type is read from the morphing data stored in the database.

The system then proceeds from Step S206 to Step S208, wherein it is determined whether or not the adjective has comparative or superlative forms based on information stored in the database. If the adjective has no comparative or superlative forms, in Step S210 it sets the "degree to generate" to regular thereby preventing the generation of comparative or superlative forms even if requested by input data. Thereafter, if the answer to Step S208 is no, the system proceeds to Step S212 where it determines whether or not the adjective is irregular based on information stored in the database (a table of irregular adjectives, for example). If it is, the system proceeds to Steps S214 where the irregular stems for the adjective are retrieved from the database. If not, the system proceeds to Step S216 wherein the base word is used. Thereafter, in Step S218, it determines whether or not the word ends in "tens". If so, then the adjective type is set to "simple" in Step S220, the "ens" is removed from the end of the word in Step S222, and the regular stem is set to the results in Step S224. Thus, the variable which holds the "regular stem" is set to the result occurring when removing the "-ens" from the end of the adjective (e.g., the "regular stem" for "zweitiens" changes to "zweit").

If in Step S218 it is determined that the word does not end in "tens", the system proceeds to Steps S226 wherein the regular stem is set to the original word. Thereafter, in Step S228, the comparative stem is set to the original word plus "plus er". Finally, the system proceeds to Step S230 wherein the superlative stem is set to the original word plus "plus st". After either of Step S214, Step S230, or Step S224, the system proceeds to Step S232 wherein it is determined whether or not to generate the comparative form based upon input data. If so, the comparative stem is used in Step S234. The comparative stem is normally the adjective+"-er" ending (e.g., the comparative stem of "klein" is "kleiner").

If the comparative form is not to be generated in Step S234, it is determined whether or not to generate the superlative form in Step S236 based upon input data. If it is determined to generate the superlative form, then the superlative stem is used in Step S238 and, in Step S240 "am" is added to the beginning and "+en" is added to the end of the word. If it is determined not to generate the superlative form in Step S236, the regular stem is used in Step S242. In either event, after any of Step S234, Step S240, or Step S242, the system proceeds to Step S244 where it is determined whether or not the ending "er" should be added based upon input data. If so, then in Step S246 "+er" is added to the end of the word based upon input data. If not, then it is determined in Step S248 whether or not to added "e" as an ending to the word. If so, then in Step S250 "+e" is added to the end of the word. If not, then the system proceeds to Step S252 where it is determined whether or not to add the ending "es" based upon input data. If so, then in Step S254 "+es" is added to the end of the word. If not, the system proceeds to Step S256 wherein it is determined whether or not to add the ending "en" to the word based upon input data. If so, then in Step S258 "+en" is added to the end of the word. If not, then the system proceeds to Step S260 wherein it is determined whether or not to add "em" to the end of the word based upon input data. If so, then in Step S262, "+em" is added to the end of the word. If not, or following any of Step S246, Step S250, Step S254, Step S258, or Step S262, the system proceeds to Step S264.

Thereafter, in Step S264, spelling rules are applied to resolve consonant combinations, double vowels, and to remove any remaining "+" characters. Next, the system moves to Step S266 wherein the result variable is set to the generated word form. Thereafter, the system ends in Step S268.

Figure 8A:
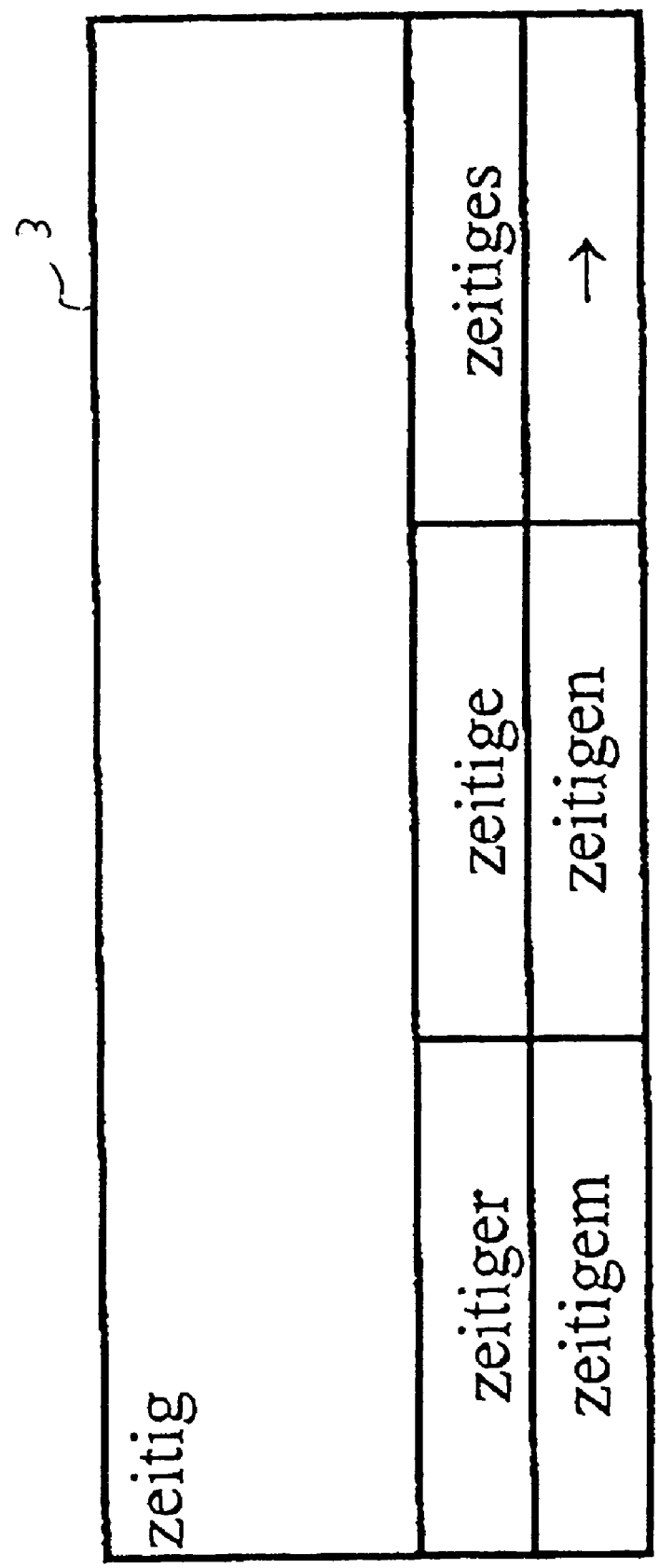
FIGS. 8a to 8c are examples of adjective morphing.
Figure 8B:
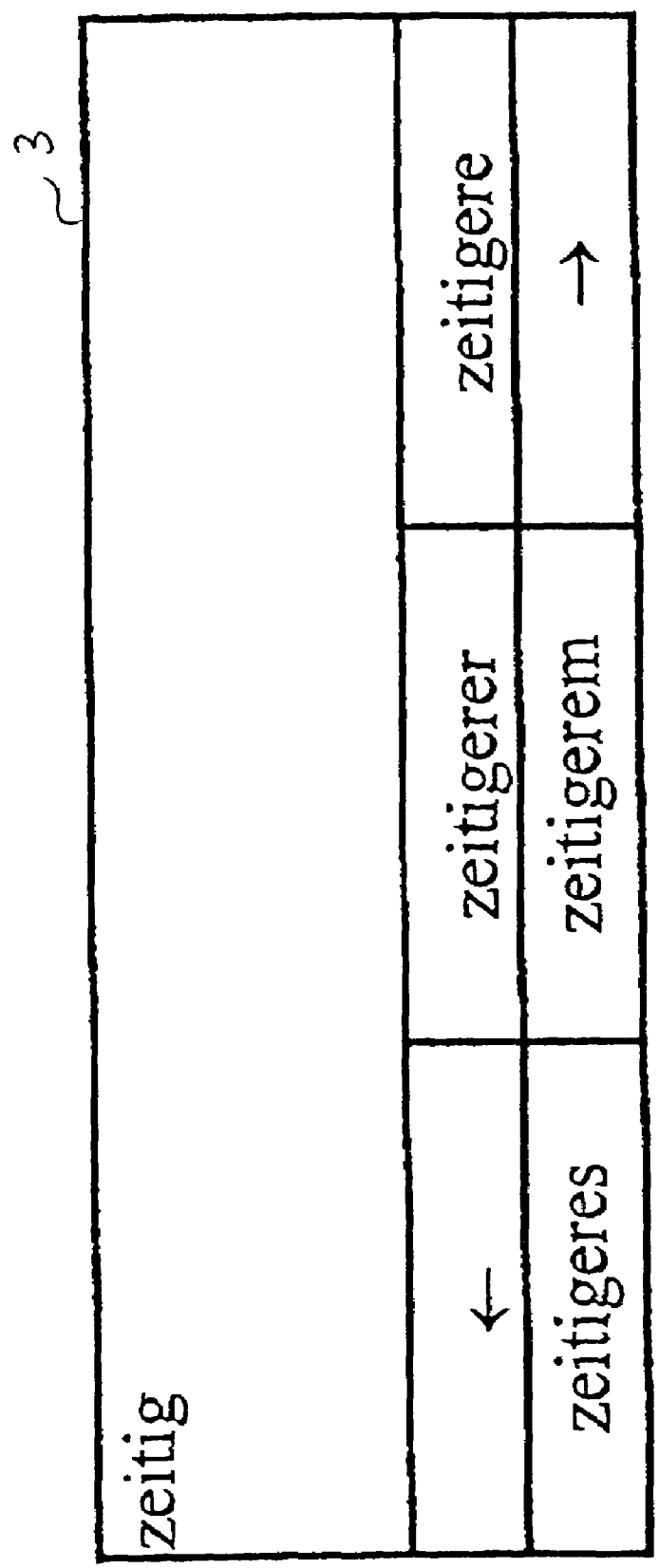
Figure 8C:
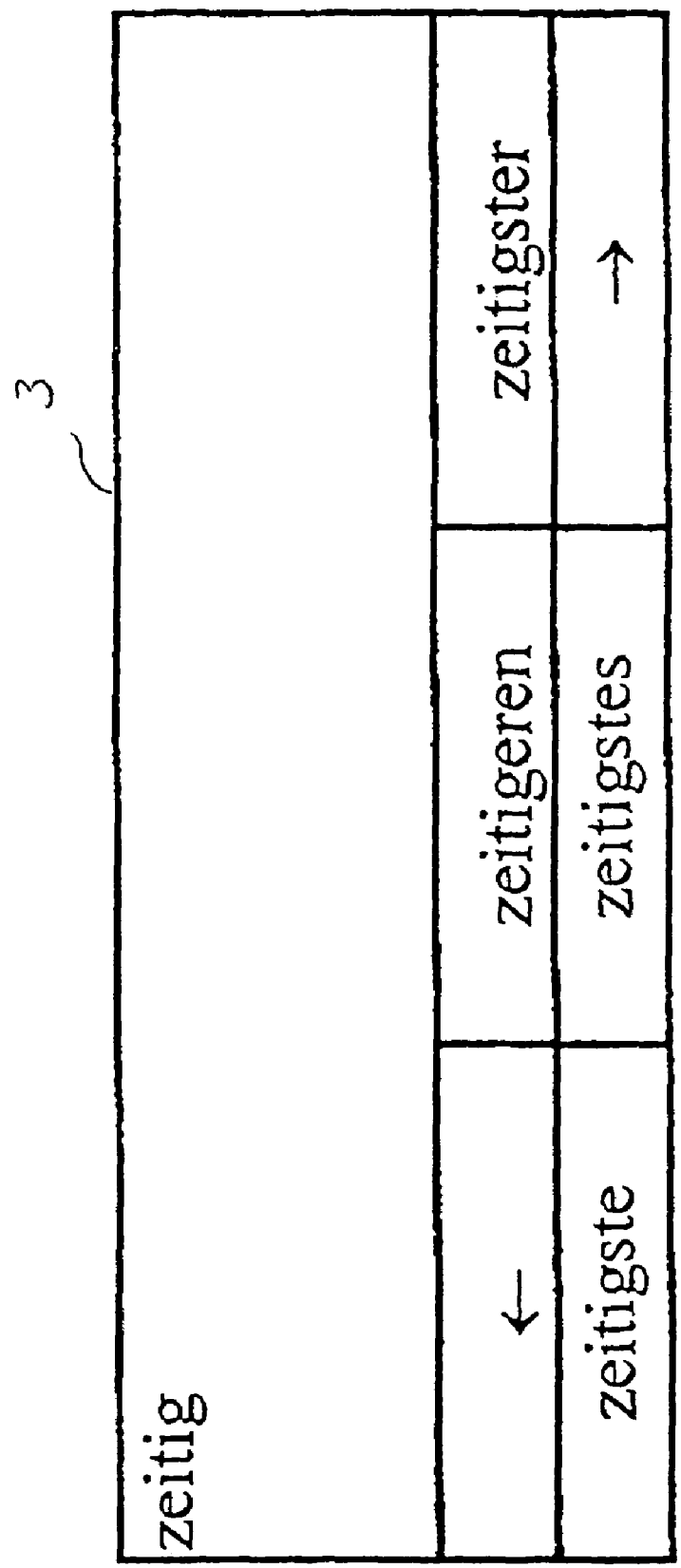

FIGS. 8a and 8b show examples of adjective morphing. Initially, assuming that the word "zeitig" is eventually predicted and selected, the word "zeitig" is displayed in display 3 as shown in FIG. 8a. As the database stores morph codes of various words such as zeitig, the microprocessor 4 is further adapted to control the display to display morphs of the selected word in response to receipt of the selection of the displayed word including associating morph codes. Thus, based upon the stored morph codes for "zeitig", additional forms or morphs of the adjective "zeitig" are derived from the morph codes using the adjective morphing process of the present application, such as that previously described with regard to FIG. 7. As more than six forms of the word are generated, five of these forms and an arrow are shown in FIG. 8a, four more forms with an arrow directing one to the previous screen or to the next subsequent screen are shown in FIG. 8b, and an additional four forms are shown in FIG. 8c.

Figure 9A:
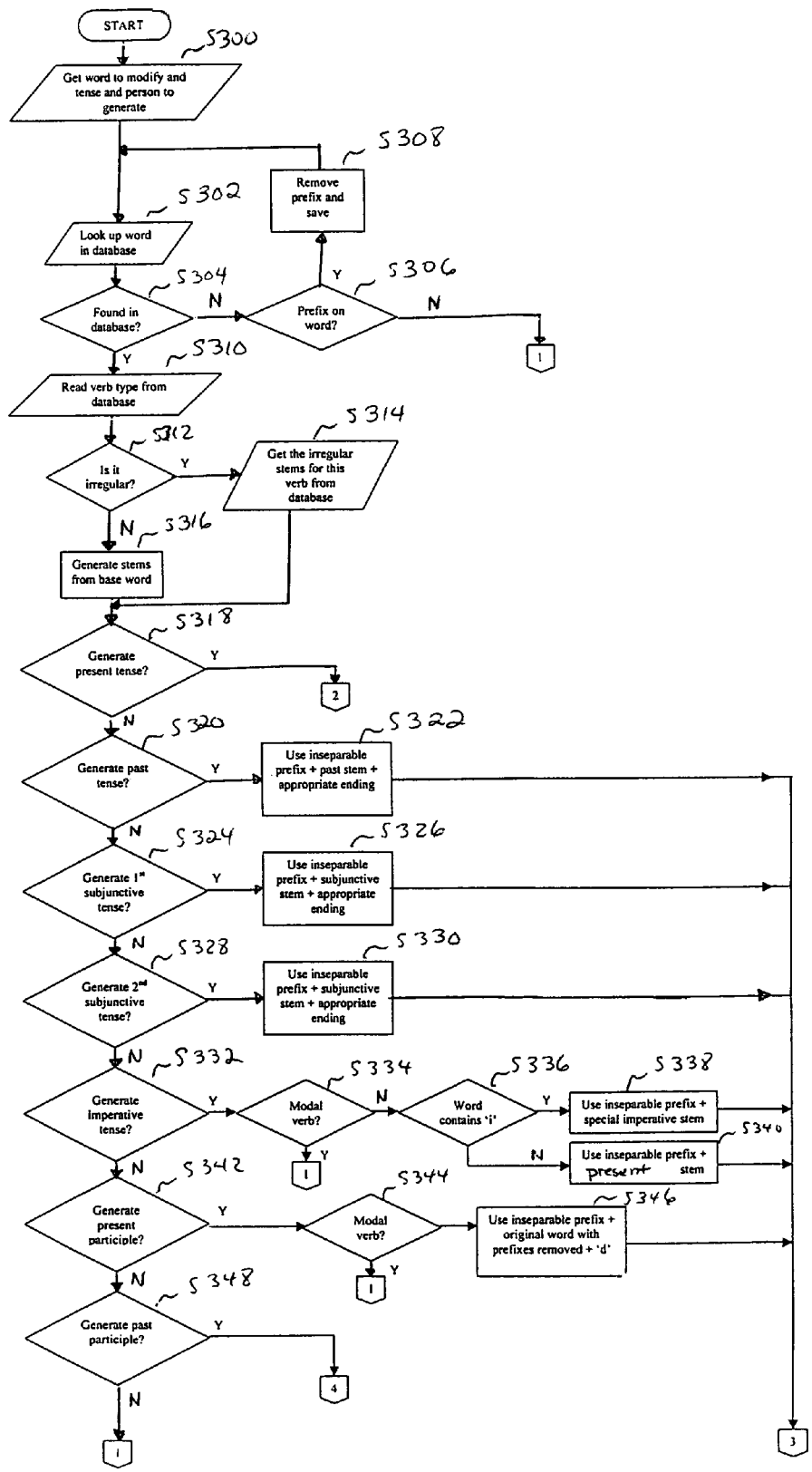
FIGS. 9a to 9c are flowcharts illustrating exemplary methodology for verb morphing.
Figure 9B:
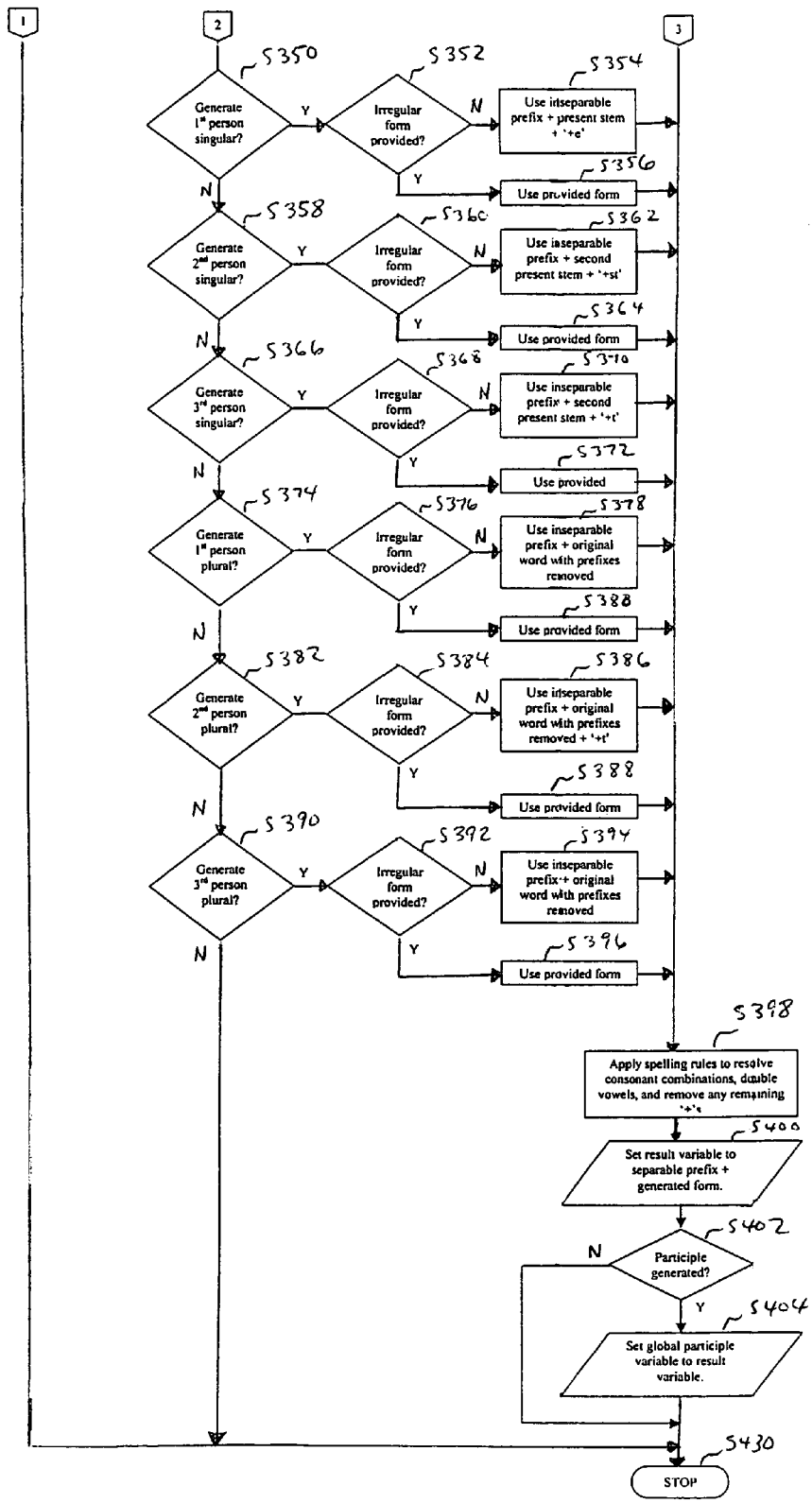
Figure 9C:
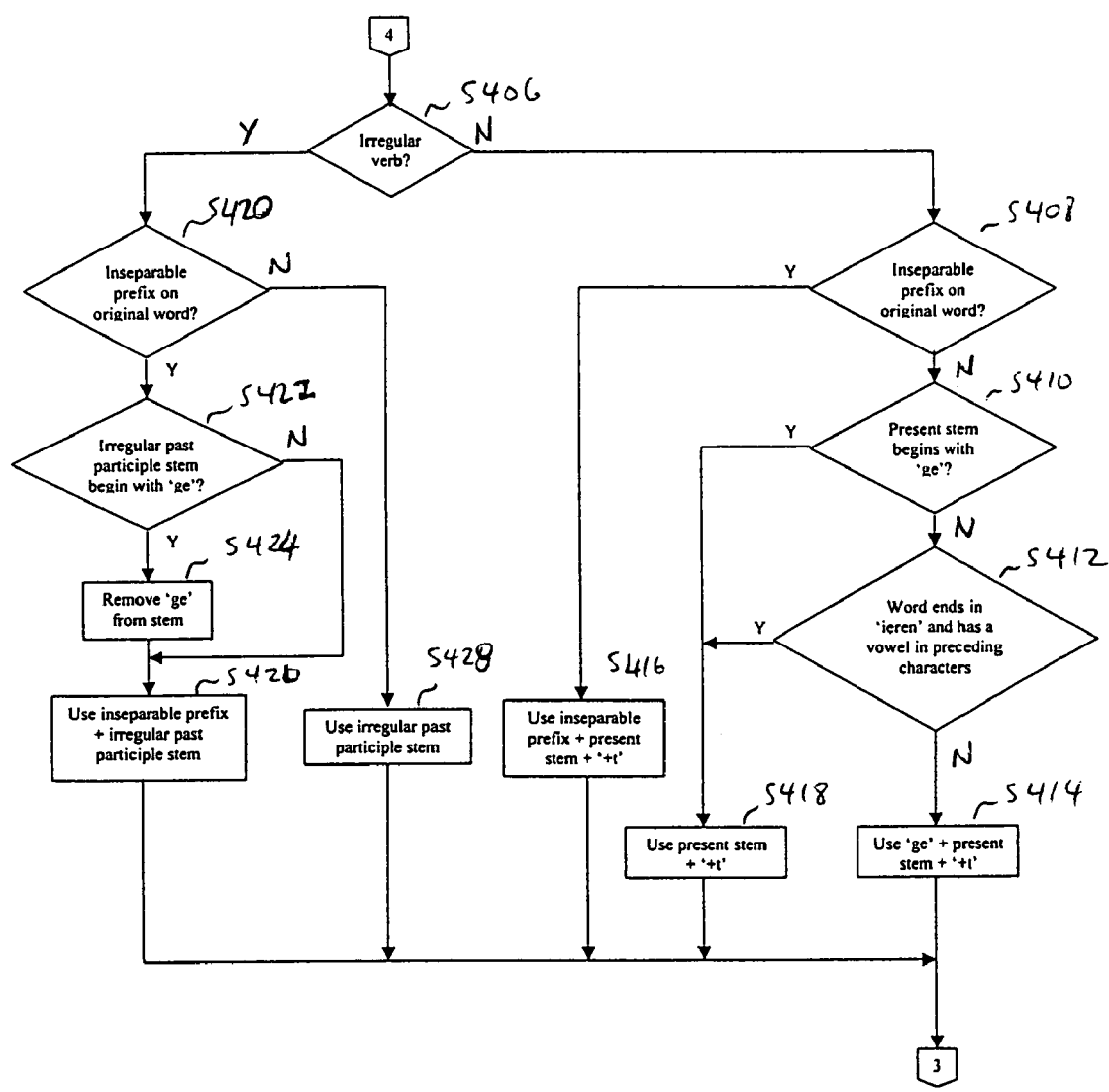

FIGS. 9a–c are directed to an exemplary verb morphing process or insertable morphing function for verbs used by the microprocessor 4 in conjunction with the information stored in the database, including morph codes. Again, the exemplary process is in the German language, but should not be limited as such. The verb morphing process, which is significantly more complicated than the noun and adjective morphing process, will be described as follows.

Initially, in Step S300, the word to modify is obtained, along with the input verb tense and person to generate. Thereafter, in Step S302, the word is looked up in the database by microprocessor 4. In Step S304, it is then determined whether or not the word was found in the database. If not, the system proceeds to Step S306, where it is determined whether or not a prefix exists on the word based upon information stored in the database. If so, the system moves to Step S308 wherein the prefix is removed and saved, and wherein the system moves back to Step S302 wherein the word without the prefix is looked up in the database. If there is no prefix on the word, the system moves to the end of the process.

Assuming that the word is found by microprocessor 4 in the database, the system proceeds to Step S310 wherein the verb-type is read from the morphing information stored in the database. In Step S312, it is determined whether or not the verb is irregular based upon information stored in the database (irregular verb table). If so, the irregular stems for this verb are obtained from the database in Step S314. If not, the stems are generated from the base word in Step S316.

After either of Steps S314 or S316, the system proceeds to Step S318, wherein it is determined whether or not to generate the present tense of the verb based upon input data. If so, the system proceeds to Step S350 of FIG. 9b.

If it is determined not to generate the present tense, then it is determined in Step S320 whether or not the past tense should be generated based upon input data. If so, then the system proceeds to Step S322 wherein the inseparable prefix is used, plus the past stem, plus an appropriate ending. If it is determined not to generate the past tense in Step S320, the system proceeds to Step S324 wherein it is determined whether or not to generate the first subjunctive tense based upon input data. If so, in Step S326, the inseparable prefix is used, plus the subjunctive stem, plus an appropriate ending. If not, it is determined in Step S328 whether or not to generate the second subjunctive tense based upon input data. If so, in Step S330, the inseparable prefix is used, plus the subjunctive stem, plus an appropriate ending.

If it is determined that the second subjunctive tense should not be generated in Step S328, the system moves to Step S332 and it is determined whether or not to generate the imperative tense based upon input data. If so, the system determines whether or not it is a modal verb (from a stored table) in Step S334. If it is, then the system ends in Step S430. If not, however, the system proceeds to Step S336 wherein it is determined whether or not the word contains an "i". If so, the system proceeds to Step S338 wherein the inseparable prefix is used plus a special imperative stem. If not, the system proceeds to Step S340 wherein the inseparable prefix is used, plus the present stem.

If it is determined that the imperative tense should not be generated in Step S332, then the system proceeds to Step S342 wherein it is determined whether or not to generate the present participle based upon input data. If so, then it is determined whether or not it is a modal verb in Step S334. If it is a modal verb, the system ends in Step S430. If not, in Step S346, the inseparable prefix is used, plus the original word with prefixes removed, plus "d". After any of Steps S322, S326, S330, S338, S340 or S346, the system proceeds to Step S398 of FIG. 9b.

If it is determined that the present participle should not be generated in Step S342, the system proceeds to Step S348 wherein it is determined whether or not to generate the past participle based upon input data. If not, the system ends in Step S430. If so, the system proceeds to Step S406 as shown in FIG. 9c.

FIG. 9b begins with Step S350. Step S350 is reached when it is determined that the present tense of the verb should be generated in Step S318. In Step S350, it is determined whether or not to generate the first person singular form of the verb based upon input data. If so, it is determined in Step S352 whether or not an irregular form of the verb is provided based upon information stored in the database. If it is, the provided form is used in Step S356. If not, an inseparable prefix, plus the present stem, plus a "+e" is utilized in Step S354.

If it is determined not to generate the first person singular form of the verb in Step S350, the system proceeds to Step S358 where it is determined whether or not to generate the second person singular form of the verb based upon input data. If so, it is determined whether or not an irregular form of the verb is provided in Step S360 based upon information stored in the database. If so, the provided form is used in Step S364 and if not, in Step S362, the inseparable prefix, plus the second present stem, plus "+sf" is used.

If it is determined not to generate the second person singular form of the verb, the system moves to Step S366 where it is determined whether or not the third person singular form of the verb should be generated based upon input data. If so, it determines whether or not an irregular form of the verb is provided in Step S368 based upon information stored in the database. If so, the provided form is used in Step S372, and if not, in Step S370, the inseparable prefix, plus the second present stem, plus "+t" is used.

If it is determined not to generate the third person singular form of the verb in Step S366, the system moves to Step S374 where it is determined whether or not the first person plural form of the verb should be generated based upon input data. If so, the system moves to Step S376, wherein it determines whether or not an irregular form of the verb has been provided based upon information stored in the database. If so, the provided form is used in Step S380, and if not, in Step S378, the inseparable prefix, plus the original word with prefixes removed is used.

If it is determined not to generate the first person plural form of the verb in Step S374, the system moves to Step S382 wherein it determines whether or not to generate the second person plural form of the verb based upon input data. If so, the system moves to Step S384 where it determines whether or not an irregular form of the verb has been provided based upon information stored in the database. If so, the provided form is used in Step S388, and if not, in Step S386, the inseparable prefix is used, plus the original word with prefixes removed, plus "+t".

Finally, if it is determined not to generate the second person plural form of the verb in Step S382, the system moves to Step S390 where it is determined whether or not to generate the third person plural form of the verb based upon input data. If so, it is determined whether or not an irregular form of the verb is provided in Step S392 based upon information stored in the database. If so, the provided form is used in Step S396 and if not, in Step S394, the inseparable prefix is used, plus the original word, plus prefixes removed.

Following each of Steps S354, S356, S362, S364, S370, S372, S378, S380, S386, S388, S394, or S396, the system moves to Step S398 wherein spelling rules are applied to resolve consonant combinations, double vowels, and to remove any remaining "+" characters. Thereafter, the system proceeds to Step S400 wherein the result variable (the result of the function is set to the result variable) is set to the separable prefix plus the generated form. The system then proceeds to Step S402 wherein it determines whether or not the participle should be generated based upon input data. If not, the system stops in Step S430. If so, the participle is saved as a global participle variable, which is set to the result variable in Step S404. This is done so that the global participle can be morphed as adjectives in word prediction.

FIG. 9c begins with Step S406 which is reached when it is determined in Step S348 that the past participle form of the verb should be generated. In Step S406, it is determined whether or not the verb is an irregular verb based upon information stored in the database. If not, the system proceeds to Step S408 where it is determined whether or not there is an inseparable prefix on the original word based on information stored in the database. If so, the system proceeds to Step S416 wherein the inseparable prefix plus the present stem, plus "+t" is used. If not, the system proceeds to Step S410 wherein it is determined whether or not the present stem begins with "ge". If so, the present stem plus "+t" is used in Step S418. If not, the system proceeds to Step S412 wherein it is determined whether or not the word ends in "ieren" and has a vowel in preceding characters. If so, the system proceeds to Step S418. If not, the system proceeds to Step S414 wherein "ge" plus the present stem plus "+t" is used.

In Step S406, if it is determined that the verb is an irregular verb, then the system proceeds to Step S420 where it is determined whether or not there exists an inseparable prefix on the original word based upon information stored in the database. If not, the system proceeds to Step S428 wherein the irregular past participle stem is used. If it determines that an inseparable prefix does not exist in the word in Step S420, the system moves to Step S422 wherein it determines whether or not the irregular past participle stem begins with "ge" based upon information stored in the database. If so, the system moves to Step S424, wherein the "ge" is removed from the stem. If not, or after Step S424, the system proceeds to Step S426 wherein the inseparable prefix plus the irregular past participle stem of the verb is used. Following each of Steps S426, S428, S416, S418, and S414, the system proceeds to Step S398 as previously described with regard to FIG. 9b.

Figure 10A:
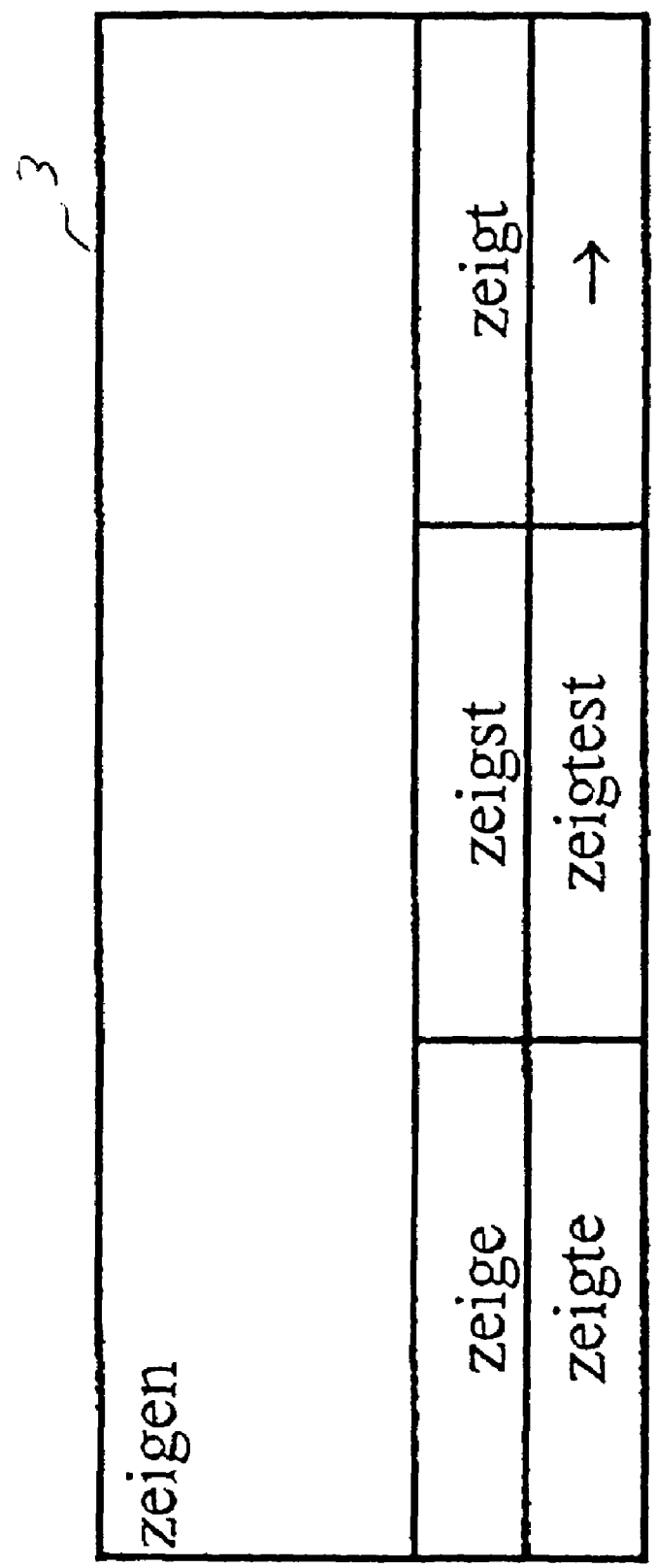
FIGS. 10a and 10b are examples of verb morphing.
Figure 10B:
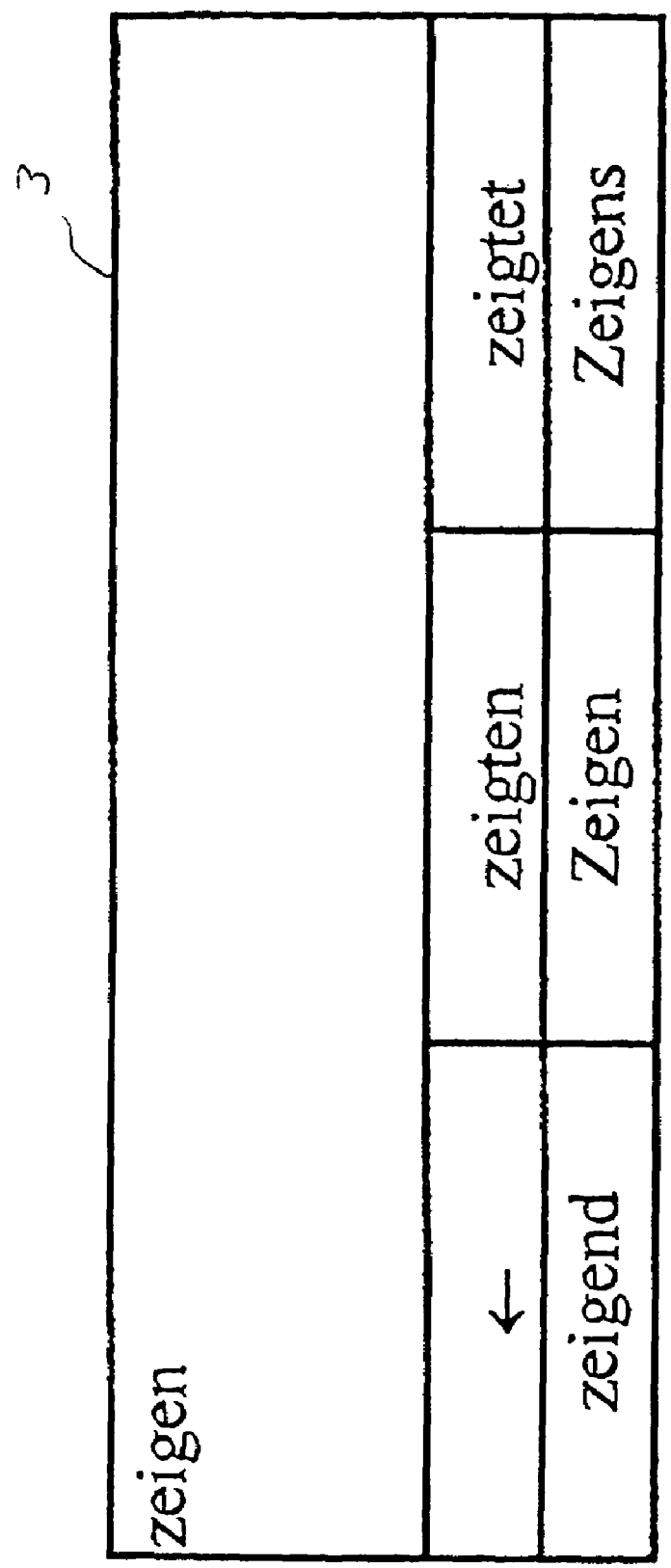

As can be seen the verb morphing process of the present application is extremely complex, but can be handled easily based upon the system shown in FIGS. 9a–c and adequately stored morphing data. As such, instead of storing over some 70 different forms of some various verbs in a single database, only a single form of the verb need be stored with other forms or other morphs being automatically generated and displayed to the user in the word prediction manner upon selecting the verb itself. As shown in FIG. 10a, for example, when the verb "zeigen" is eventually selected, the various conjugations of the verb are displayed for selection by the user. FIG. 10a illustrates five forms of the verb and an arrow leading to FIG. 10b, which displays an additional five forms of the verb.

Figure 11:
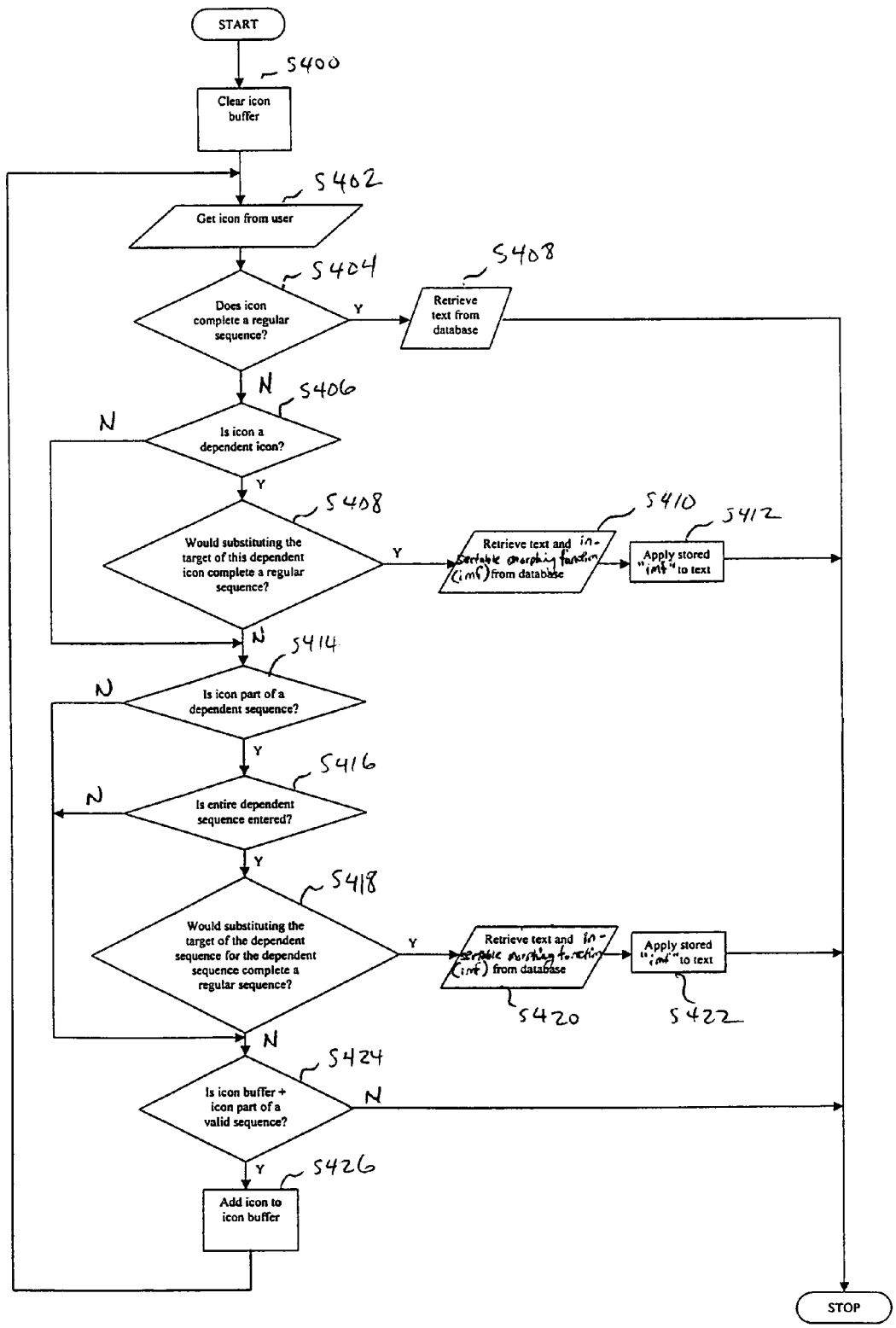
FIG. 11 is a flowchart illustrating the methodology of dependent sequencing in conjunction with various morphing methodologies.

FIG. 11 of the present application indicates an alternate use for the various insertable morphing functions ("imf") or morphing processes, such as those shown in FIGS. 6–10. Although these morphing processes or "imfs" can be utilized in word prediction to automatically generate different morphs of selected nouns, verbs or adjectives, these morphing processes or "imfs" can also be used in combination with the icon sequencing mode of the present application. As discussed in U.S. Pat. Nos. 5,297,041 and 5,097,425, each of which is incorporated herein by reference, in the icon or symbol sequencing mode, various symbols are used to access prestored words or messages. In the system shown in FIG. 11 of the present application, the symbol for the "taxi" plus the "wir" key, when sequenced in combination, accesses and retrieves the word "fahren", meaning "to go" in the German language.

As can be seen by the complicated process shown in FIGS. 9a–c, and as can be seen by the fact that some German verbs include 70 different forms thereof, it would take up a large amount of memory to separately store each of the various verb forms of the word "fahren" if the various verb conjugations were separately stored in a database for various key combinations. Instead, the system as shown in FIG. 11 of the present application, utilizes the "imfs", such as those of FIGS. 6–10 of the present application, to derive the different morphs of various nouns, verbs, and adjectives accessed by a symbol sequence. This is done by making some icons dependent icons which, when completing an icon sequence, allow for the morphing or creation of a morphed form of the main word; and by forming dependent icon sequences wherein an entire sequence of symbols directs the system to use the "imfs", such as those of FIGS. 6–10, to create a morphed form of the word.

As shown in FIG. 11 in Step S400, the icon buffer is initially cleared. Thereafter, in Step S402 an icon is selected by a user and is identified by microprocessor 4. For example, the user selects the "taxi" icon. In Step S404, it is determined whether or not the icon completes a regular prestored icon or symbol sequence, used to access a stored word or phrase, as discussed in detail in U.S. Pat. No. 5,297,041 or U.S. Pat. No. 5,097,425. Assuming that the "taxi" icon is the first icon entered by a user, and assuming that the taxi icon does not itself complete an icon sequence, the system then moves to Step S406. However, if the taxi icon were selected and then the "wir" icon was selected, the "wir" icon would complete an icon sequence in Step S404, and in Step S408, the word or phrase corresponding to the icon sequence would then be retrieved from the database, namely the word "fahren".

If the icon does not complete a regular sequence as determined in Step S404, then the system moves to Step S406 wherein it is determined whether the icon is a dependent icon. A dependent icon is one which is used to modify the form of a stored word. For example, if the taxi icon and the "ich" icon are selected, the "ich" icon is dependent upon the "wir" icon. While "taxi" plus "wir" will access the word "fahren", the "taxi" icon plus the "ich" icon will trigger the use of morphing macros. The target icon of the dependent icon (with "wir" being the target and "ich" being the dependent icon) is then substituted for the dependent icon to retrieve the stored text word ("fahren"), which will then be morphed (as directed by the "ich" icon) to produce the word "fahre".

Accordingly, if the icon is determined to be a dependent icon, the system moves to Step S408 wherein it is determined whether or not substituting the target of the dependent icon (i.e. substituting the target "wir" for the icon "ich" in the sequence) would complete a regular sequence. If "taxi" plus "wir", the target of "ich", would complete a sequence, then the text "fahren" would be retrieved from the database in Step S410 along with the appropriate "imf" information. The "imf" corresponding to the insertable morphing function for verbs (since "fahren" is a verb as identified by the morphing data stored with the word "fahren"), such as that shown in FIGS. 9a–c, would then be applied to the word "fahren" to derive the word "fahre" in step S412.

Assuming, however, in Step S408 that the target of the dependent icon would not complete a regular sequence, the system would then move to Step S414. Further, if the icon is not a dependent icon, the system also moves to Step S414.

In Step S414, it determines whether or not the icon is part of the dependent sequence. A dependent icon sequence includes a sequence of icons which are dependent upon at least one target icon. For example, the sequence of the "dinosaur" and the "ich" icons is dependent upon the "wir" icon. In the case of the "taxi" icon, the "taxi" icon is not part of a dependent icon sequence. However, if it were part of a dependent icon sequence, the system would move to Step S416, wherein it would be determined whether or not the entire dependent sequence had been entered. If so, the system would then move to Step S418 wherein it would be determined whether or not substituting the target of the dependent sequence, for the dependent sequence itself, would complete a regular icon sequence in Step S418. If so, then the system moves to Step S420, wherein the text corresponding to the main icon sequence is retrieved, along with the appropriate morphing data and insertable morphing function from the database. Thereafter, the "imf" is then applied to the text in Step S422 to generate the morph of the word.

If substituting the target of the dependent sequence, for the dependent sequence itself, would not complete a regular sequence in Step S418, or if the answer to Step S414 or Step S416 is no, the system moves to Step S424 wherein it is determined whether or not the icon buffer plus the icon are part of a valid sequence. If not, the system ends, and if so, the icon is added to the icon buffer and the system returns to Step S402 to await input of the next icon by the user.

An example of a dependent icon sequence is the "dinosaur" icon plus the "ich" icon. This entire sequence is dependent upon the word "wir". The dinosaur represents past tense and thus is used, in combination with other icons forming other dependent icon sequences, to trigger the verb morphing macro to formulate the past tense of certain words. As an example, assuming that the taxi icon is the first icon entered by the user, the taxi icon is merely added to the icon buffer in Step S426 as described above. Next, the user then enters the dinosaur icon in Step S402. The taxi icon plus the dinosaur icon does not complete a regular sequence in Step S404, and thus the system moves to Step S406. The dinosaur icon is not a dependent icon when taken alone (it is part of a dependent icon sequence). The system then proceeds to Step S414 where it is determined that the dinosaur icon is part of a dependent icon sequence, but in Step S416 it is determined that the entire dependent icon sequence has not been entered. Thus, the dinosaur icon is merely added to the taxi icon in the icon buffer in Step S426, and entry of a subsequent icon is awaited in Step S402.

Assuming that the "ich" icon is entered in Step S402, it is first determined that the "ich" icon (when added to the taxi and dinosaur icons) does not complete a regular icon sequence in Step S404. Thus, the taxi icon plus the dinosaur icon plus the "ich" icon do not complete a regular icon sequence which would merely access a word or phrase from the database and memory in Step S408.

Instead, the system moves to Step S406 wherein it is determined that the "ich" icon is a dependent icon (it alone is dependent upon "wir"). The substituting of the target of this dependent icon does not complete a regular sequence as determined in Step S408, however, and the system moves to Step S414. In Step S414, it is determined that the "ich" icon is part of a dependent icon sequence; and in Step S416 it is determined that the entire dependent sequence has been entered (dinosaur and "ich"). Thereafter, in Step S418 it is determined that substituting the target of the dependent icon sequence for the dependent sequence would complete a regular sequence (i.e., substituting "wir" for the "dinosaur+ich" dependent icon sequence does form a sequence as "taxi"+"wir"=the sequence for "fahren"). Thus, in Step S420, the word "fahren" is retrieved, along with the appropriate morphing data and the appropriate insertable morphing function. Then, in Step S422, the "imf" for verbs is used to generate the word "fuhr", the past tense of fahren used in conjunction with the singular form of a noun.

As such, utilizing dependent icon sequencing, various forms of words can be easily generated without the necessity to store an incredible number of forms of the same words, utilizing the insertable morphing functions of the present application, such as those described in FIGS. 6–10 of the present application, for example. In a system used for a language such as the German language, wherein various forms of many nouns, verbs, and adjectives exist, the amount of memory saved is substantial using the methodology of FIG. 11 of the present application involving dependent icon sequences. While the methodology of FIG. 11 has been discussed with regard to a system in a German language, it is equally applicable to morphing macros of any language, and is equally applicable to any symbol or icon sequencing system.

Accordingly, the morphing methodology is easily applied to icon or symbol sequencing systems. A plurality of input symbols are initially received. Thereafter, it is determined whether or not the plurality of input symbols include a sequence of symbols dependent upon at least one other symbol. In response to determining that the plurality of input symbols included a dependent sequence, a stored word corresponding to a symbol sequence including the at least one of the symbols is morphed, to produce at least one modified form of the displayed word. Preferably the dependent symbol sequence is replaced by the at least one other symbol in response to determining that the plurality of input symbol included a dependent sequence; and a stored word corresponding to a symbol sequence including the substituted at least one symbol, is morphed.

FIG. 12 illustrates another embodiment of the present application wherein the word prediction software including word chunking as described in connection with FIG. 3, and/or the morphing algorithms of FIGS. 6–10, and/or the dependent icon sequencing of FIG. 11 are housed within a single article of manufacture 50 itself. The article of manufacture 50 can include any type of storage element which can be associated and used in conjunction with system 8 (and specifically microprocessor 4), including but not limited to a floppy disc, zip drive, memory chip, compact disc, optical disc, magneto-optic disc, etc. The article of manufacture includes code segments for causing the computer (system 8 and more specifically microprocessor 4) to perform various functions as previously described in connection with FIG. 3, and/or at least one of FIGS. 6–10, and/or FIG. 11, and to interact with information stored in memory 6. The database could be stored in memory 6, or could be stored in the article of manufacture 50 itself.

The invention being thus described, it would be obvious that the same could be varied in many ways. Such variations are not to be regarded as a departure from the spirit and scope of the invention and all such modifications as would be obvious to one of ordinary skill in the art are intended to be included within the scope of the following claims.

What is claimed is:

1. A method comprising:
   receiving input of a plurality of symbols;
   determining whether or not the plurality of input symbols includes one of a plurality of dependent sequences of symbols, dependent upon at least one other symbol; and
   morphing a stored word corresponding to a sequence of symbols including the at least one other symbol, the morphing being based upon at least one of the input symbols not included in the sequence of symbols corresponding to the stored word, in response to determining that the plurality of input symbols included one of the plurality of dependent sequences, to produce at least one modified form of the stored word, wherein at least one symbol in the dependent sequence is polysemous.

2. The method of claim 1, wherein the symbols are input by actuation of corresponding keys on a keyboard.

3. The method of claim 1, further comprising:
   storing words in a database corresponding to symbol sequences.

4. The method of claim 3, wherein the database also includes morphing codes, stored in association with the words and used in morphing the stored words.

5. The method of claim 4, wherein the morphing codes indicate a part of speech of the stored words.

6. The method of claim 5, wherein the stored word is morphed in a manner dependent upon the part of speech of the stored word.

7. The method of claim 1, wherein the stored word is morphed in a manner dependent upon a part of speech of the stored word.

8. The method of claim 1, wherein the symbols include pictorial illustrations.

9. The method of claim 1, comprising:
   accessing a stored word corresponding to the sequence of the plurality of input symbols, in response to determining that the plurality of input symbols did not include one of the plurality of dependent sequences.

10. The method of claim 1, further comprising:
    substituting at least one of the input symbols with the at least one other symbol in the dependent symbol sequence, in response to determining that the plurality of input symbols included one of the plurality of dependent sequences, wherein a stored word corresponding to the symbol sequence including the substituted at least one symbol is morphed.

11. The method of claim 10, further comprising:
    storing words in a database corresponding to symbol sequences.

12. The method of claim 11, wherein the database also includes morphing codes, stored in association with the words and used in morphing the stored words.

13. The method of claim 12, wherein the morphing codes indicate a part of speech of the stored words.

14. The method of claim 1, wherein the dependent sequence of symbols does not include a word corresponding thereto.

15. The method of claim 1, wherein at least one symbol in the dependent sequence dictates a type of morphing to be done to a stored word.

16. The method of claim 15, wherein the type of morphing relates to verb tense.

17. The method of claim 1, wherein the dependent sequence of symbols includes at least one symbol only selected to control morphing.

18. A word prediction system, comprising:
    a database, adapted to store a plurality of words in association with symbol sequences;
    a display, adapted to display the stored words and modified forms of the stored words for selection; and
    a controller adapted to receive input of a plurality of symbols, adapted to determine whether or not the plurality of input symbols includes one of a plurality of dependent sequences of symbols, dependent upon at least one other symbol, and adapted to morph a stored word corresponding to a sequence of symbols including the at least one other symbol, the morphing being based upon at least one of the input symbols not included in the sequence of symbols corresponding to the stored word, in response to determining that the plurality of input symbols included one of the plurality of dependent sequences, to produce at least one modified form of the stored word for display, wherein at least one symbol in the dependent sequence is polysemous.

19. The word prediction system of claim 18, further comprising:
a keyboard, including a plurality of keys associated with symbols, wherein the keyboard is adapted to input the symbols upon actuation of corresponding keys.

20. The word prediction system of claim 19, wherein the symbols include pictorial illustrations.

21. The word prediction system of claim 18, wherein the database also includes morphing codes, stored in association with the words and used in morphing the stored words.

22. The word prediction system of claim 21, wherein the morphing codes indicate a part of speech of the stored words.

23. The word prediction system of claim 22, wherein the controller is adapted to morph the stored word in a manner dependent upon the part of speech of the stored word.

24. The word prediction system of claim 18, wherein the controller is adapted to morph the stored word in a manner dependent upon a part of speech of the stored word.

25. The word prediction system of claim 18, wherein the symbols include pictorial illustrations.

26. The word prediction system of claim 18, wherein the controller is further adapted to access a stored word from the database which corresponds to the sequence of the plurality of input symbols, in response to determining that the plurality of input symbols did not include one of the plurality of dependent sequences.

27. The word prediction system of claim 18, wherein the controller is further adapted to substitute at least one of the input symbols with the at least one other symbol in the dependent symbol sequence and to access a stored word, corresponding to a symbol sequence including the substituted at least one symbol for morphing, in response to determining that the plurality of input symbols included one of the plurality of dependent sequences.

28. The word prediction system of claim 27, further comprising:
a keyboard, including a plurality of keys associated with symbols, wherein the keyboard is adapted to input the symbols upon actuation of corresponding keys.

29. The word prediction system of claim 27, wherein the database also includes morphing codes, stored in association with the words and used in morphing the stored words.

30. The word prediction system of claim 29, wherein the morphing codes indicate a part of speech of the stored words.

31. The system of claim 18, wherein the
dependent sequence of symbols does not include a word corresponding thereto.

32. The system of claim 18, wherein at least one symbol in the dependent sequence dictates a type of morphing to be done to a stored word.

33. The system of claim 32, wherein the type of morphing relates to verb tense.

34. The system of claim 18, wherein the dependent sequence of symbols includes at least one symbol only selected to control morphing.

35. An article of manufacture for use in conjunction with a computer, comprising:
a first code segment for causing the computer to receive input of a plurality of symbols;
a second code segment for causing the computer to determine whether or not the plurality of input symbols includes one of a plurality of dependent sequences of symbols, dependent upon at least one other symbol; and
a third code segment for causing the computer to morph a stored word corresponding to a sequence of symbols including the at least one other symbol, the morphing being based upon at least one of the input symbols not included in the sequence of symbols corresponding to the stored word, in response to determining that the plurality of input symbols included one of the plurality of dependent sequences, to produce at least one modified form of the stored word, wherein at least one symbol in the dependent sequence is polysemous.

36. The article of manufacture of claim 35, wherein the symbols are input by actuation of corresponding keys on a keyboard.

37. The article of manufacture of claim 35, further comprising:
a fourth code segment for causing the computer to store words in a database corresponding to symbol sequences.

38. The article of manufacture of claim 29, wherein the database also includes morphing codes, stored in association with the words and used in morphing a stored word.

39. The article of manufacture of claim 38, wherein the morphing codes indicate a part of speech of the stored words.

40. The article of manufacture of claim 39, wherein the stored word is morphed in a manner dependent upon the part of speech of the stored word.

41. The article of manufacture of claim 35, wherein the stored word is morphed in a manner dependent upon a part of speech of the stored word.

42. The article of manufacture of claim 35, wherein the symbols include pictorial illustrations.

43. The article of manufacture of claim 35, further comprising:
a fourth code segment for causing the computer to access a stored word corresponding to the sequence of the plurality of input symbols, in response to determining that the plurality of input symbols did not include one of the plurality of dependent sequences.

44. The article of manufacture of claim 35, further comprising:
a fourth code segment for causing the computer to substitute at least one of the input symbols with the at least one other symbol in the dependent symbol sequence, in response to determining that the plurality of input symbols included one of the plurality of dependent sequences, wherein a stored word corresponding to a symbol sequence including the substituted at least one symbol is morphed.

45. The article of manufacture of claim 44, further comprising:
a fifth code segment for causing the computer to store words in a database corresponding to symbol sequences.

46. The article of manufacture of claim 45, wherein the database also includes morphing codes, stored in association with the words and used in morphing the stored words.

47. The article of manufacture of claim 46, wherein the morphing codes indicate a part of speech of the stored words.

48. The article of manufacture of claim 35, wherein at least one symbol in the dependent sequence dictates a type of morphing to be done to a stored word.

49. The article of manufacture of claim 48, wherein the type of morphing relates to verb tense.

50. The article of manufacture of claim 35, wherein the dependent sequence of symbols includes at least one symbol only selected to control morphing.

* * * * *